(12) United States Patent
Calvin et al.

(10) Patent No.: US 9,448,773 B2
(45) Date of Patent: Sep. 20, 2016

(54) SYSTEMS AND METHODS FOR IMPLEMENTING A UNIFORM APPLICATION USER INTERFACE ACROSS A MULTI-TENANT ENVIRONMENT

(71) Applicant: salesforce.com, inc., San Francisco, CA (US)

(72) Inventors: Philip N. Calvin, San Francisco, CA (US); Richard P. Pack, III, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 5 days.

(21) Appl. No.: 14/244,291

(22) Filed: Apr. 3, 2014

(65) Prior Publication Data

US 2014/0304692 A1 Oct. 9, 2014

Related U.S. Application Data

(60) Provisional application No. 61/807,884, filed on Apr. 3, 2013.

(51) Int. Cl.
*G06F 9/44* (2006.01)
(52) U.S. Cl.
CPC .................................. *G06F 8/36* (2013.01)
(58) Field of Classification Search
None
See application file for complete search history.

(56) References Cited

U.S. PATENT DOCUMENTS 5,577,188 A 11/1996 Zhu
5,608,872 A 3/1997 Schwartz et al.

(Continued)

OTHER PUBLICATIONS

OODEsign-Design Priciples, "Design Principles" located at: http://www.oodesign.com/design-principles.html, 2012.*
Dip-Dependency Inversion Principle-1996, "The Dependency Inversion Principle", Located at: https://web.archive.org/web/20120105102039/http://www.objectmentor.com/resources/articles/dip.pdf 1996.*

(Continued)

*Primary Examiner* — Wei Zhen
*Assistant Examiner* — Hossain Morshed
(74) *Attorney, Agent, or Firm* — Blakely Sokoloff Taylor & Zafman LLP

(57) ABSTRACT

In accordance with disclosed embodiments, there are provided systems and methods for implementing a uniform application user interface across a hosted computing environment, such as an on-demand or cloud computing environment which utilizes multi-tenant database technologies, client-server technologies, traditional database technologies, or other computing architecture in support of the hosted computing environment. According to a particular embodiment such a system includes a processor and a memory to execute instructions at the system; a foundation layer to define a plurality of components; the plurality of components, each to define one or more features to be consumed by an arbitrary application built from the features; wherein the one or more features are to each incorporate one or more of the components defined by the foundation layer and further wherein each of the one or more features have visibility to one or more interfaces available for the respective features to connect with but have no visibility to or about any arbitrary application that will consume them; a glue logic layer to link the features to the arbitrary application built from the features, wherein the arbitrary application built from the features has a one-way view of the features consumed through the glue logic layer without permitting the features visibility to or about the arbitrary application built; and wherein the arbitrary application built from the features is to execute within the host organization. Other related embodiments are disclosed.

25 Claims, 11 Drawing Sheets

(56) References Cited

U.S. PATENT DOCUMENTS

| | | | |
|---|---|---|---|
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec | |
| 6,324,693 B1 | 11/2001 | Brodersen et al. | |
| 6,336,137 B1 | 1/2002 | Lee et al. | |
| D454,139 S | 3/2002 | Feldcamp | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker et al. | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 6,904,449 B1* | 6/2005 | Quinones | G06Q 10/10 709/203 |
| 7,134,122 B1* | 11/2006 | Sero | G06F 8/61 717/177 |
| 7,188,158 B1* | 3/2007 | Stanton | G06F 9/541 709/220 |
| 7,340,411 B2 | 3/2008 | Cook | |
| 7,620,655 B2 | 11/2009 | Larsson et al. | |
| 8,352,384 B2 | 1/2013 | Mansinghka et al. | |
| 8,412,797 B2* | 4/2013 | Shavlik | G06F 8/65 707/610 |
| 2001/0044791 A1 | 11/2001 | Richter et al. | |
| 2002/0022986 A1 | 2/2002 | Coker et al. | |
| 2002/0029161 A1 | 3/2002 | Brodersen et al. | |
| 2002/0029376 A1* | 3/2002 | Ambrose | G06F 8/20 717/113 |
| 2002/0035577 A1 | 3/2002 | Brodersen et al. | |
| 2002/0042264 A1 | 4/2002 | Kim | |
| 2002/0042843 A1 | 4/2002 | Diec | |
| 2002/0072951 A1 | 6/2002 | Lee et al. | |
| 2002/0078046 A1* | 6/2002 | Uluakar | G06F 8/20 |
| 2002/0082892 A1 | 6/2002 | Raffel et al. | |
| 2002/0095650 A1* | 7/2002 | Green | G06F 8/20 717/104 |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0152102 A1 | 10/2002 | Brodersen et al. | |
| 2002/0161734 A1 | 10/2002 | Stauber et al. | |
| 2002/0162090 A1 | 10/2002 | Parnell et al. | |
| 2002/0165742 A1 | 11/2002 | Robins | |
| 2003/0004971 A1 | 1/2003 | Gong et al. | |
| 2003/0018705 A1 | 1/2003 | Chen et al. | |
| 2003/0018830 A1 | 1/2003 | Chen et al. | |
| 2003/0066031 A1 | 4/2003 | Laane | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker | |
| 2003/0088545 A1 | 5/2003 | Subramaniam et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec | |
| 2003/0189600 A1 | 10/2003 | Gune et al. | |
| 2003/0191743 A1 | 10/2003 | Brodersen et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2004/0001092 A1 | 1/2004 | Rothwein et al. | |
| 2004/0010489 A1 | 1/2004 | Rio | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan, Jr. et al. | |
| 2004/0199489 A1 | 10/2004 | Barnes-Leon et al. | |
| 2004/0199536 A1 | 10/2004 | Barnes Leon et al. | |
| 2004/0199543 A1 | 10/2004 | Braud et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0007978 A1 | 1/2005 | Slemmer et al. | |
| 2005/0050555 A1 | 3/2005 | Exley et al. | |
| 2005/0091098 A1 | 4/2005 | Brodersen et al. | |
| 2006/0136875 A1* | 6/2006 | Thorpe | G06F 21/16 717/122 |
| 2007/0208587 A1* | 9/2007 | Sitaraman | G06Q 10/103 709/232 |
| 2008/0301228 A1 | 12/2008 | Flavin | |
| 2009/0125879 A1* | 5/2009 | Miloushev | G06F 8/24 717/108 |
| 2010/0280863 A1* | 11/2010 | Wilcock | G06Q 10/00 705/7.11 |
| 2011/0119352 A1 | 5/2011 | Perov et al. | |
| 2011/0126168 A1* | 5/2011 | Ilyayev | G06F 9/5072 717/103 |
| 2012/0036452 A1 | 2/2012 | Coleman et al. | |
| 2012/0054626 A1* | 3/2012 | Odenheimer | G06F 9/5072 715/738 |
| 2012/0109882 A1* | 5/2012 | Bouse | H04L 67/306 707/607 |
| 2012/0151505 A1* | 6/2012 | Verissimo de Oliveira | G06F 11/3664 719/328 |
| 2012/0185821 A1* | 7/2012 | Yaseen | G06F 8/10 717/105 |
| 2012/0203859 A1 | 8/2012 | Krzyzanowski | |

(56) References Cited

U.S. PATENT DOCUMENTS

2013/0013750 A1    1/2013  Butler et al.
2014/0040791 A1*  2/2014  Kim ........................ G06F 3/048
                                                          715/762
2014/0304692 A1*  10/2014  Calvin ...................... G06F 8/36
                                                          717/162

OTHER PUBLICATIONS

Fowler-Inversion of Control-2004, "Inversion of Control Contaners and the Dependency Injection pattern", located at: http://martinfowler.com/articles/injection.html, 2012.*

* cited by examiner

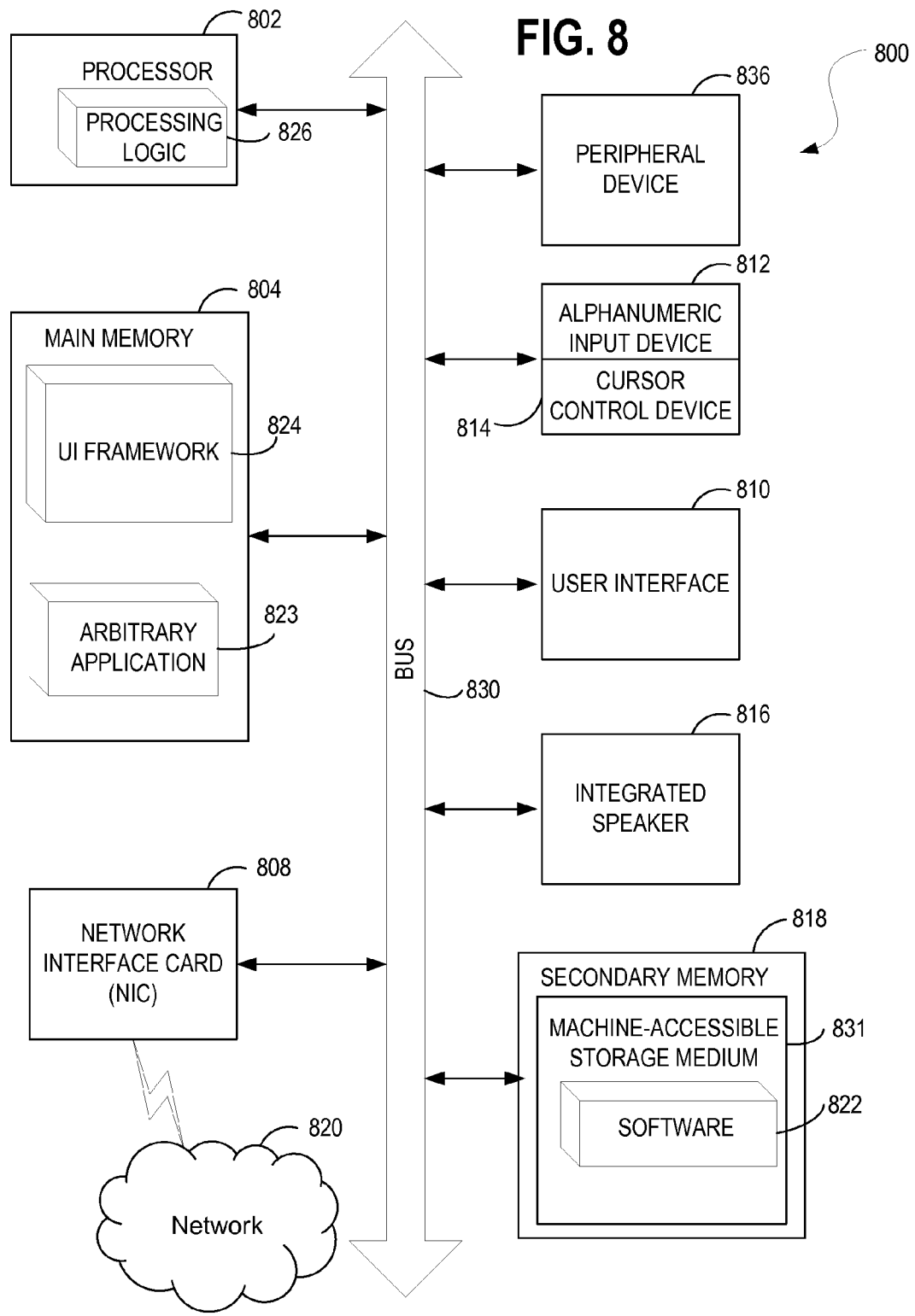

SYSTEMS AND METHODS FOR IMPLEMENTING A UNIFORM APPLICATION USER INTERFACE ACROSS A MULTI-TENANT ENVIRONMENT

CLAIM OF PRIORITY

This application is related to, and claims priority to, the U.S. provisional patent application entitled "SYSTEM AND METHOD FOR A UNIFORM APPLICATION USER INTERFACE ACROSS A MULTI-TENANT ENVIRONMENT," filed on Apr. 3, 2013, having an application No. of 61/807,884, the entire contents of which are incorporated herein by reference.

COPYRIGHT NOTICE

A end of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments of the invention relate generally to the field of computing, and more particularly, to systems and methods for implementing a uniform application user interface across a hosted computing environment, such as an on-demand or cloud computing environment which utilizes multi-tenant database technologies, client-server technologies, traditional database technologies, or other computing architecture in support of the hosted computing environment.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed inventions.

Within a hosted environment various technologies are utilized to service many different tenants (e.g., customer organizations and their users) simultaneously. Such technologies may include, for example, client-server, traditional databases, and multi-tenant database systems. A multi-tenant database system in particular operates to store data on behalf of a multitude of subscribers, each being a "tenant" of the database system, hence the term multi-tenant database system. Many subscribers (e.g., users or tenants) utilize the computing technologies of the host organization to access analytics, charts, views, reports, and other such data which is stored within the servers, systems, databases, and multi-tenant database system of the host organization. For instance, a sales team may utilize sales data stored within such a system. A host organization that implements the multi-tenant database system may additionally provide a variety of tools, including application development tools to create customized feature sets and interfaces by which the tenants may access, manipulate, display, and analyze their data within an on-demand environment, for instance, as a cloud based service accessible via a public Internet.

While conventionally available User Interface (UI) architectures and technologies exist, the problem with prior solutions is that over time, the UI architectures become increasingly tightly coupled with the underlying features and functionality they are meant to support, which in turn renders conventional UI architectures unsuitable for use with new and different projects. That is to say, the UI architecture and the underlying features become overly interdependent such that one cannot easily be removed from the other for re-use elsewhere. Take for example, a particular aspect of a conventional UI architecture which is used to connect up with a given feature, say a social media feed available from a social network such as Facebook. For instance, the UI architecture may provide a feature that takes a viewer from the particular Facebook feed being viewed to the Facebook user that posted the feed.

Such a UI architecture component may create a connection, change the URL at the top of the browser, which in turn triggers other events to occur, such as loading the user's profile page. Over time the system becomes tightly coupled with its container resulting in a maintenance problem due to the glue like integration throughout the codebase between the UI architecture and the underlying features and functionality. As systems become increasingly larger the stickiness or "glue" eventually becomes immutable for all practical purposes.

The present state of the art may therefore benefit from the systems and methods for implementing a uniform application user interface across a multi-tenant environment as described herein.

BRIEF DESCRIPTION OF THE DRAWINGS

Embodiments are illustrated by way of example, and not by way of limitation, and will be more fully understood with reference to the following detailed description when considered in connection with the figures in which:

FIG. 8 illustrates a diagrammatic representation of a machine in the exemplary form of a computer system, in accordance with one embodiment.

DETAILED DESCRIPTION

Figure 1:
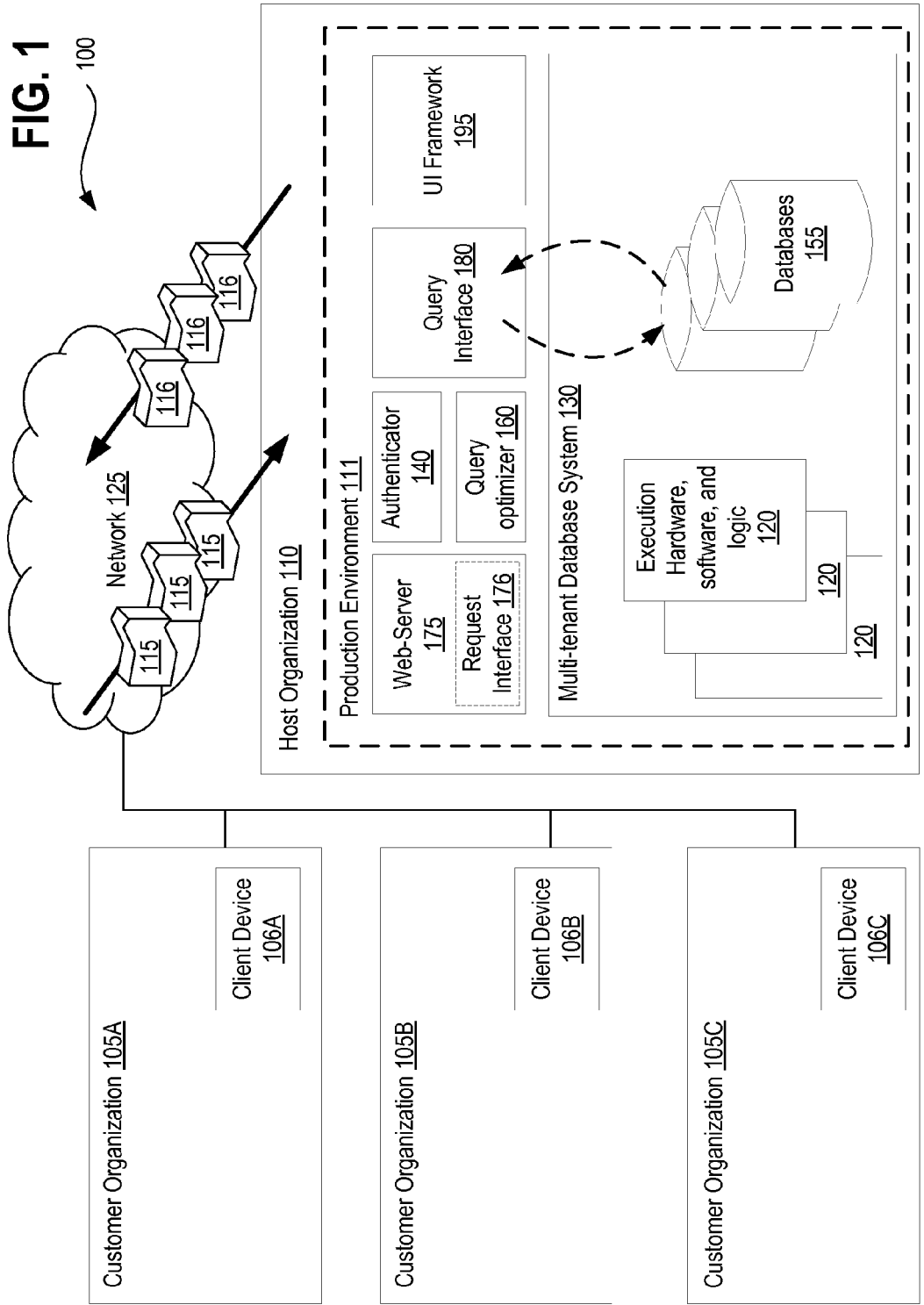
FIG. 1 depicts an exemplary architecture in accordance with described embodiments.

Described herein are systems and methods for implementing a uniform application user interface across a hosted computing environment, such as an on-demand or cloud computing environment which utilizes multi-tenant database technologies, client-server technologies, traditional database technologies, or other computing architecture in support of the hosted computing environment. Such an exemplary system may include, for example: a processor and a memory to execute instructions at the system; a foundation layer to define a plurality of components; the plurality of components, each to define one or more features to be consumed by an arbitrary application built from the features; wherein the one or more features are to each incorporate one or more of the components defined by the foundation layer and further wherein each of the one or more features have visibility to one or more interfaces available for the respective features to connect with but have no visibility to or about any arbitrary application that will consume them; a glue logic layer to link the features to the arbitrary application built from the features, wherein the arbitrary application built from the features has a one-way view of the features consumed through the glue logic layer without permitting the features visibility to or about the arbitrary application built; and wherein the arbitrary application built from the features is to execute within the host organization.

The systems and methods described enable a predictable and cohesive relationship between a UI architecture and underlying features and functionality which operates within a large scale and highly used hosted computing environment supporting multiple distinct tenants and further which does not result in the stickiness and coupling which is problematic with conventionally available solutions.

Certain embodiments operate within a hosted computing environment, also referred to as a provider of on-demand services, on-demand database services, cloud computing services, or simply a host organization that provides services to subscribing customer organizations. Such host organizations utilize various technologies to service many different tenants (e.g., customer organizations and their users) simultaneously. Such technologies may include, for example, client-server implementations, computing grids, computing pods or pools of work machines, traditional databases, single tenancy database systems and/or multi-tenant database systems. A multi-tenant database system in particular operates to store data on behalf of a multitude of subscribers, each being a "tenant" of the database system, hence the term multi-tenant database system. Many subscribers (e.g., users or tenants) utilize the computing technologies of the host organization to access analytics, charts, views, reports, and other such data which is stored within the servers, systems, databases, and multi-tenant database system of the host organization. For instance, a sales team may utilize sales data stored within such a system.

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to an apparatus for performing the operations disclosed herein. This apparatus may be specially constructed for the required purposes, or it may be a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, embodiments are not described with reference to any particular programming language. It will be appreciated that a variety of programming languages may be used to implement the teachings of the embodiments as described herein.

Embodiments may be provided as a computer program product, or software, that may include a machine-readable medium having stored thereon instructions, which may be used to program a computer system (or other electronic devices) to perform a process according to the disclosed embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical), etc.

Any of the disclosed embodiments may be used alone or together with one another in any combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems where are not directly discussed.

FIG. 1 depicts an exemplary architecture 100 in accordance with described embodiments. In one embodiment, a production environment 111 is communicably interfaced with a plurality of client devices 106A-C (e.g., such as mobile devices, smart phones, tablets, PCs, etc.) through host organization 110. In one embodiment, a multi-tenant database system 130 includes databases 155, for example, to store tables, datasets, and underlying database records with user data on behalf of customer organizations 105A-C (e.g., tenants of the multi-tenant database system 130 or their affiliated users).

Multi-tenant database system 130 includes a plurality of underlying hardware, software, and logic elements 120 that implement database functionality and a code execution environment within the host organization 110. In accordance with one embodiment, multi-tenant database system 130 further implements databases 155 to service database queries and other data interactions with the databases 155. The hardware, software, and logic elements 120 of the multi-tenant database system 130 are separate and distinct from a plurality of customer organizations (105A, 105B, and 105C) which utilize the services provided by the host organization 110 by communicably interfacing to the host organization 110 via network 125. In such a way, host organization 110 may implement on-demand services, on-demand database services or cloud computing services to subscribing customer organizations 105A-C.

Host organization 110 receives input and other requests 115 from a plurality of customer organizations 105A-C via network 125 (such as a public Internet). For example, incoming database queries, API requests, interactions with displayed graphical user interfaces and displays at the client devices 106A-C, or other inputs may be received from the customer organizations 105A-C to be processed against the multi-tenant database system 130. In certain embodiments, the inputs and requests 115 from the customer organizations 105A-C may include custom code, features, and functionality to be hosted and executed within the host organization 110 on behalf of such customer organizations 105A-C. In such embodiments, responses 116 may constitute data records, reports, analytics, charts, or other information provided by either the customer organizations' 105A-C previously provided customized code, features, and functionality or may be provided by code, features, and functionality made accessible to the customer organizations 105A-C as a service, or may be some combination of both.

In one embodiment, each customer organization 105A-C is an entity selected from the group consisting of: a separate and distinct remote organization, an organizational group within the host organization 110, a business partner of the host organization 110, or a customer organization 105A-C that subscribes to cloud computing services provided by the host organization 110.

In one embodiment, requests 115 are received at, or submitted to, a web-server 175 within host organization 110. Host organization 110 may receive a variety of requests for processing by the host organization 110 and its multi-tenant database system 130. Incoming requests 115 received at web-server 175 may specify which services from the host organization 110 are to be provided, such as query requests, search request, status requests, database transactions, graphical user interface requests and interactions, processing requests to retrieve, update, or store data on behalf of one of the customer organizations 105A-C, code execution requests, and so forth. Web-server 175 may be responsible for receiving requests 115 from various customer organizations 105A-C via network 125 and provide a web-based interface or other graphical displays to an end-user client device 106A-C or machine originating such data requests 115.

Host organization 110 may implement a request interface 176 via web-server 175 or as a stand-alone interface to receive requests packets or other requests 115 from the client devices 106A-C. Request interface 176 further supports the return of response packets or other replies and responses 116 in an outgoing direction from host organization 110 to the client devices 106A-C.

Authenticator 140 operates on behalf of the host organization to verify, authenticate, and otherwise credential users attempting to gain access to the host organization.

Query interface 180 provides functionality to pass queries from web-server 175 into the multi-tenant database system 130 for execution against the databases 155 or other data stores of the host organization's production environment 111. In one embodiment, the query interface 180 implements an Application Programming Interface (API) through which queries may be executed against the databases 155 or other data stores including queries arriving from a foundational layer of the UI Framework 195. Query optimizer 160 performs query translation and optimization, for instance, on behalf of other functionality such as functionality of a graphical interface which possesses sufficient information to architect a query (e.g., identifying parameters, targets, tables, records, rows, actions, etc.) yet lacks the necessary logic to actually construct the appropriate query syntax into the databases 155 of the multi-tenant database system 130. In other instances, query optimizer 160 modifies a submitted query to optimize its execution within the host organization without affecting the resulting dataset returned responsive to such an optimized query.

UI Framework 195 enables a predictable and cohesive relationship between a UI architecture and underlying features and functionality, whether provided by the host organization 110 or the customer organizations 105A-C, permitting the UI architecture and features and functionality to operate within the large scale and highly used multi-tenant environment established by the computing architecture of the host organization 110. Use and implementation of such a UI framework 195, as will be described in additional detail below, further avoids the stickiness and coupling between the features and functionality and the UI architecture which is problematic with conventionally available solutions.

Figure 2:
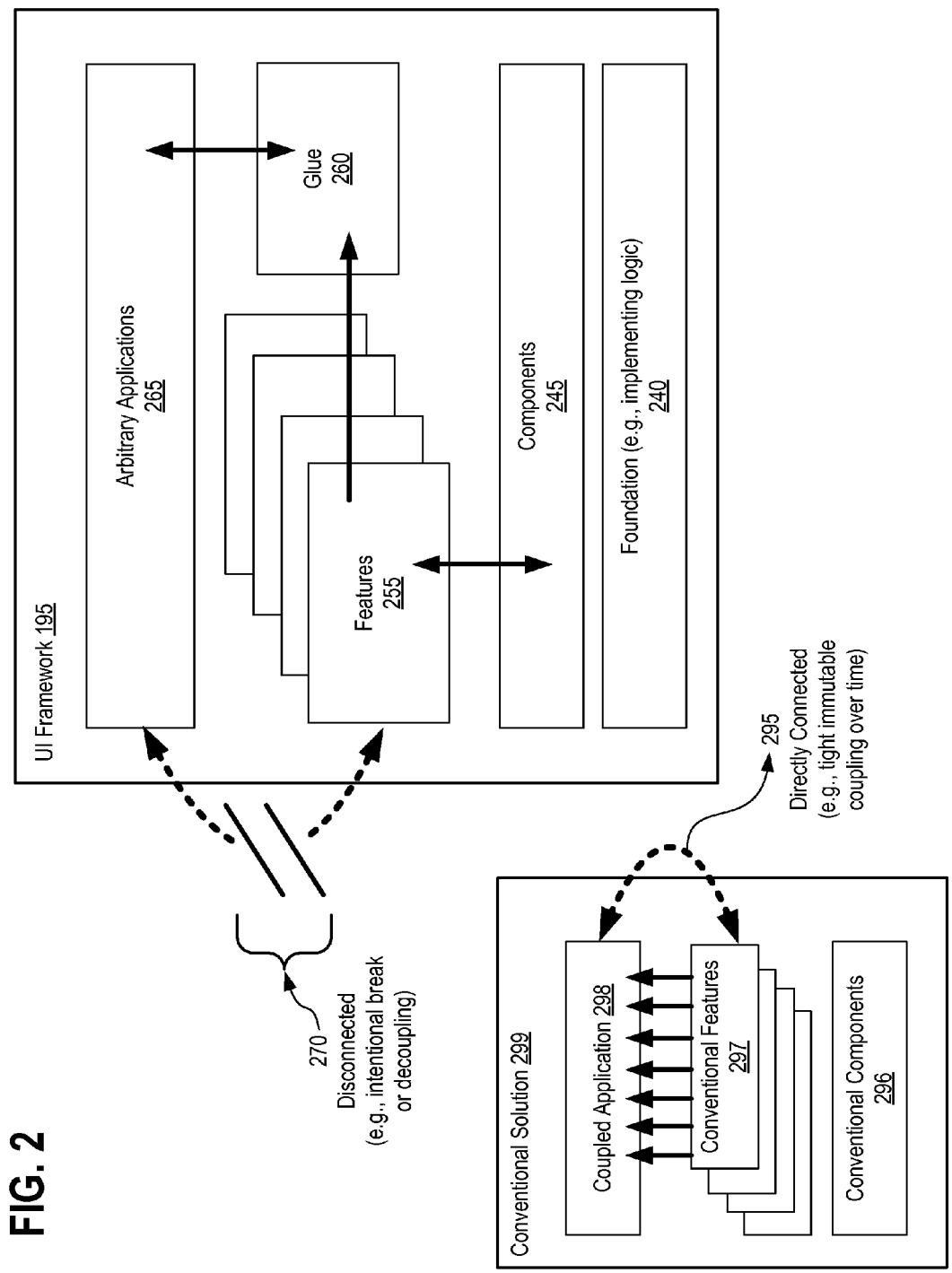
FIG. 2 depicts the UI Framework from FIG. 1 in additional detail which is contrasted against that of a conventional solution.

FIG. 2 depicts the UI Framework 195 from FIG. 1 in additional detail which is contrasted against that of a conventional solution 299. In particular, UI Framework 195 includes foundation 240 (e.g., implementing logic) at the bottom with components 245 above. The components are consumed by and interact with features 255 which importantly, in the context of the UI Framework 195 are disconnected 270 from the arbitrary applications 265 above. That is to say, the features 255 are intentionally broken or decoupled from the arbitrary applications 265, thus preventing an increase in interdependency and the immutable linkages between applications and features as is problematic with conventional solutions 299. Rather, the features communicate through glue 260 which in turn communicates with arbitrary applications 265, without having any direct communication whatsoever between the arbitrary applications 265 and the features 255 or the components beneath them 245.

Conversely, the conventional solution 299 depicts that conventional components 296 reside at the bottom with conventional features 297 above which are directly connected 295 (e.g., tightly and immutably coupled over time) to the coupled applications 298 of the conventional solution 299. It is this direct connection 295 resulting in the tightly bound and immutable coupling overtime that is to be avoided by design, use, and implementation of the UI Framework 195 as is described herein.

The foundation 240 provides implementing logic to the UI Framework 195, supporting re-usable components 245 and forming the base or foundation for the new UI architecture which is enabled by way of the UI framework 195. The foundation 240 layer provides technology and implementing logic by which customer organizations, partners, or internal developers to the host organization may specify what a component is or does. For instance, at the foundation 240, a component is defined to have a certain shape, that is to say, a component is defined by a set of rules and events that the functionality of the components must adhere to, without defining the components themselves. The foundation 240 layer additionally provides components 245 and other functionality with access to information. For instance, via the foundation 240 layer, it is possible to retrieve data from the multi-tenant data base system, retrieve information from Chatter™, from Force.com™, from Data.com™, from various social networks, from available feeds, and from other external sources, all of which may be interfaced via the foundation 240 layer.

The components 245 specify what a feature is, with each feature 255 essentially being a grouping of components 245 bucketed together. Components 245 may thus be considered as the building blocks for creating features. The re-usable components 245 provide code modules that may be consumed and reused by features 255 to be consumed by the arbitrary applications 265. The components 245 themselves are either developed and provided as a service by the host organization 110 or custom developed by customer organizations and hosted by the host organization on behalf of such customer organizations, or may be developed by external partners or services providers and provided for use within the multi-tenant environment.

For instance, a customer wishing to view their pending deliveries need not write a custom component 245 which queries remote databases at DHL, UPS, USPS, FedEx, etc., rather, those service providers may, and very likely will, provide turn-key re-usable components 245 which may then be utilized by the customer organization without having to develop and customize the functionality themselves.

Instantiating a provided component 245 may require very little code, essentially requiring only that such a component 245 be identified and identifying relevant parameters, such as a customer ID or shipping ID for the pending deliveries example above. Using the provided components 245, a customer organization may develop and provide an application which permits a user to navigate to their pending deliveries, the pending deliveries being available as a list or set of records stored in the multi-tenant database system, as well as receive status available via the functionality of the provided components 245 incorporated into features which are then consumed by the application. Such status may originate external to the multi-tenant database environment, such as from the remote databases of DHL, UPS, USPS, and FedEx in the prior example, or such status may be retrieved internally, such as from the multi-tenant database system, if the pertinent information exists and is permissibly accessible.

Customer organizations may use either their own components, provided components, or a mix of such components 245 within their arbitrary applications 265 depending upon their needs and the level of customization required. Use of custom developed components 245 by a customer organization would be similar to use of provided components, except that additional code must be written by the customer organization to establish the relevant functionality of the component 245 first, before it may be utilized within features and consumed into an arbitrary application.

Components additionally provide the graphical user elements that may be placed upon a screen or display of a user's device when executing the resulting arbitrary application. Such user elements may include, for example, a date control box, a label, a user input box, a check box, a radio button, a slider, an action button (e.g., submit, cancel, edit, save, etc.), and other well known graphical elements.

The features 255 know about the interfaces that are available for them to connect with, but the features have no knowledge about the arbitrary applications 265 that will consume them. A series of well defined interfaces establishes the series of events that the features 255 are allowed to utilize. Such events are provided by the host organization, however, additional events may be defined by customer organizations and partners via extension and in turn, utilized by the features 255. According to described embodiments, features 255 may be tangible or perceivable elements, directly viewable by users of the arbitrary applications 265, without being specific to any particular application. For instance, a picture or image, a user profile, a feed, a contact or a contacts list, and so forth. Features are commonly a composition of the components 245 below them, but do not necessarily have to be.

The features 255 are written and provided by the host organization as a service to the customer organizations and provide integration to the internal computing architecture of the host organization. Because the features 255 are written and provided by the host organization, they are subject to a level of control not forced upon the arbitrary applications 265. As such, the features are consumed and communicated with in a predictable manner, thus allowing for the cohesive linkage of the features to the arbitrary applications 265 through the glue 260 without creating a tangle of code and unwanted coupling and interdependency.

Take for example the Facebook scenario above in which it is desired to provide an end user with a redirection from viewing a Facebook post to viewing the poster's profile page, for instance, subject to a click event, etc. Features 255 may provide such capabilities on behalf of the arbitrary applications 265 which may consume and implement the chosen feature 255 simply by adhering to the requirements to call upon the chosen feature 255. The host organization 110 provides the features and thus provides the appropriate venting in an appropriate manner, for instance, by establishing within the features 255, the relevant parameters to be passed in and returned as output, as well as the internal functionality of the feature, for instance, triggering the re-direction from viewing a post to viewing a poster's profile page, subject to a specified event or condition. Because the features are controlled and specify a set of predictable requirements, they may be consumed or otherwise utilized via arbitrary applications 265, regardless of whether such applications are developed by customer organizations, the host organization, partners, etc.

The Glue 260 provides a connection between the decentralized components 245 (whether provided or hosted) and allows customer organizations to create a cohesive link between their chosen features 255 and any arbitrary application 265 they develop without incurring unwanted coupling, due to the intentional disconnection 270 between the arbitrary applications 265 and the features 255, forcing the linkage through the glue 260 instead. Because the glue 260 provides the cohesiveness between features 255 and the arbitrary applications 265, the features 255 do not become interdependent upon the arbitrary applications 265 and visa versa. By forcing the cohesion through the glue 260 the features 255 themselves are prevented from knowing what the arbitrary application 265 is, what it does, etc., resulting in the disconnection 270. Rather, the arbitrary application 265 must consume the features 255 resulting in one-way knowledge by the arbitrary application rather than bi-directional knowledge by both the arbitrary application and the features consumed.

Within the arbitrary applications 265 the features 255 are stitched together forming a cohesive application having consumed the various features with a one-way knowledge of the features 255 consumed without the features 255 themselves having any knowledge whatsoever of the arbitrary application 265 or the manner in which they were consumed by the arbitrary application 265.

Figure 3:
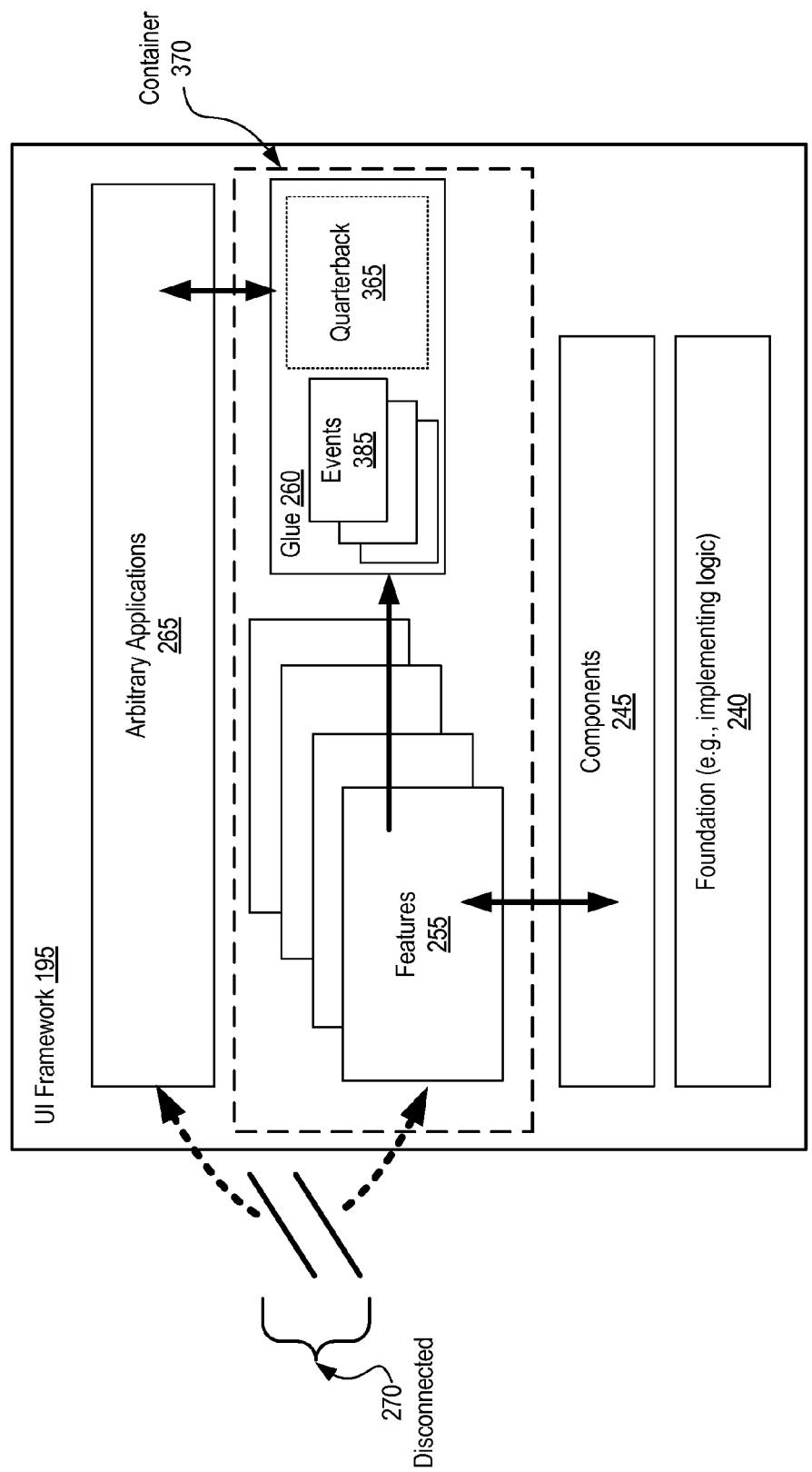
FIG. 3 depicts the UI Framework from FIGS. 1 and 2 in still further detail with the introduction of the quarterback element.

FIG. 3 depicts the UI Framework 195 from FIGS. 1 and 2 in still further detail with the introduction of the quarterback 365 and container 370 elements in accordance with certain embodiments. Here the quarterback 365 is incorporated by and interfaces with the glue 260 described previously and provides a series of well defined requirements that establish the governance of the container 370 that adopts the chosen features 255, glue 260, and quarterback 365 for consumption by an arbitrary application 265. According to the embodiment shown, the glue 260 includes events 385 and the quarterback 365 functionality. The glue 260 defines what the feature 255 are in terms of their type, and what their shape is, and what their contract is with other elements, but the glue 260 does not define what the features do because if the glue 260 were to define what the features 255 may do, then the same kind of unwanted coupling and interdependency would be created as was the problem with conventional solutions, the only difference is that the unwanted coupling would be moved to a different area of the UI architecture. Instead, the glue 260 provides cohesion without the unwanted coupling between arbitrary applications 265 and the features 255 which in turn provides long-term flexibility for the implementing system because interdependency and coupling between the features and the arbitrary applications does not build over time. Individual features 255 are compared via the glue 260 mechanism with each of the individual features 255 broadcasting to the world, "this is my contract and these are the things that I can do," establishing a type of publication/subscription model for messages and events associated with such features 255.

In accordance with certain embodiments, the quarterback 365 is responsible for receiving events 385 and importantly, the quarterback 365 determines where the received events 385 go. The quarterback 365 resides within container 370 and additionally passes events based on subscriptions. For instance, the quarterback 365 may pass a public profile for an object called based on an application calling upon the object (e.g., having asked for the object and optionally based on the condition of having requested the object from a permissible domain, website, server, or location, etc.).

Events 385 provide a series of well defined application diagnostics that define shape to communications. For example, the events 385 may define how to handle and what to do with a particular entity, such as a feed, when that entity packages an event and passes it to the quarterback which receives such events.

The container 370 defines the feel and the interaction model of the arbitrary application 265, in particular, the feel, interactions, and general flow of the UI presented to an end-user executing the arbitrary application 265. The container 370 does not, however, specify the features 255 or the connectivity of the arbitrary application 265. The container 370 is a purpose built application, either provided by the host organization as a service or developed and customized by a customer organization, partner, etc., and hosted by the host organization for execution on behalf of the customer organization, partner, etc.

Take for example a web application using pure HTML, a native iOS application (e.g., to run on iPhones, iPads, etc.), and a native Android application (e.g., an APK to run on any Android compatible platform). The HTML, iOS, and Android applications are all purpose built and in this particular example, are written by developers at the host organization and provided as a service to customer organizations.

Customer developed applications, such as page editors, comment pages, etc., may then consume the container 370 and operate in conjunction with the larger production environment and multi-tenant database system of the host organization 110 (refer back to FIG. 1 at elements 111 and 130 respectively).

Consider for example a feed system similar to the Facebook example, above, except provided by the host organization, such as the feed system provided via Chatter™ by salesforce.com which provides feeds, posts, status, and various updates regarding business interactions, etc. Take for example an end-user interacting with such a feed system as an author posting content to the feed through such a provided container 370 which is consumed by an arbitrary application 265. The container 370 thus enables the end-user to interact with the feed beyond merely authoring content and posting. For instance, the container 370 enables the end-user to perform actions such as sharing a contact with all of the end-user's followers, triggering the end-user's posting to show up on the feed as well as an update to the feed saying, for example: "User John Doe shared contact Jane Doe with his followers." The end-user initiates an action in the feed which defines, for example, that when another user clicks on the feed that user should be taken to the shared contact.

The quarterback 365 must then recognize that such a user is being taken to an entity, regardless of the entity type. The quarterback 365 need not understand the type of entity the user is being directed to, but rather, only that the user is being taken to an entity, agnostic to whether the entity is of a shared contact type entity, a custom object type entity, a shared opportunity type entity, etc.

Regardless of the entity type, an entity ID for the entity is packaged into an event having well defined requirements, such as, for this entity ID, in the present context, navigate to another specified target entity (e.g., a targeted object) to fulfill the requirements of this event. For example, the event may define calling a particular target entity/object, which has internal functionality to fire a navigation or re-direction as appropriate. Within the publication and subscription type model, once a user taps, clicks, or otherwise triggers a particular event at a displayed user interface and the current entity packages the event with a call to the appropriately defined target entity (e.g., a targeted object) and entity ID, the work of the calling entity is complete. The targeted entity/object has its own functionality to then, for example, fire the navigation to an appropriate profile page, feed, contact, etc., based on the packaged event or some other requested contextually appropriate action based on the definition of the packaged event. Many other examples are feasible as the actions are not limited to merely triggering navigation events.

From the perspective of the entity packaging the event, it is not even necessary to track whether the request landed anywhere or was fulfilled according to the model. Rather, the quarterback 365 is responsible for determining where packaged events are routed and is further responsible for applying the appropriate pivots. For instance, the quarterback 365 may collect or identify additional context for the packaged event and then, based on what type of event is being handled (e.g., a task, a detail page of a particular entity, a dashboard, a custom object, etc.), the quarterback 365 will then apply the appropriate pivot, determining where to send the event and further how the UI is adapted at the end-user's device pursuant to the handling of the packaged event.

A more detailed example is provided with regard to a "contact" or "profile" which corresponds to a particular user. In this user's feed, there may be a shared contact, for instance, similar to the example above, saying "John Doe User has shared contact Jane Doe with you" or perhaps with all of John Doe's followers. Regardless, if the user taps or clicks on the shared contact, Jane Doe, the act of tapping/clicking fires the event up to the container 370. There may be multiple such containers 370, for instance, a first container having therein a conventional web application, a second container implementing a native iOS application and a third container providing a community website. In this case, the quarterback 365 now has all of the information it needs regarding the entity that is being fired. It can say, based on heuristics, the user tapping on the contact is asking to navigate to the corresponding profile based on the event and in the context of the three distinct containers 370, the quarterback 365 may do something completely different for each.

For instance, in the case of a first container having therein the conventional web application, the quarterback 365 may recognize the entity as a profile and in turn instantiate functionality to carryout the visual aspects of the UI and populate what elements are to be displayed to the end-user's device. The functionality may interact with the databases of the multi-tenant database system to retrieve the necessary information for display and may perform other functionality, such as analysis, dashboarding, calculations, etc., as necessary for the display. Another alternative path may be followed instead, based on the identical user event of tapping on a shared contact, for instance, in the context of an iOS application the quarterback 365 may recognize the entity and recognize it specifically as a profile entity and then based on the iOS application context, the quarterback 365 will instantiate some native iOS code that is going to show very specific information about the contact available, possibly distinct from the kind of information displayed in the context of the first container with the conventional web application. Importantly, however, the same action need not be carried out. The source may be a web page or a feed, and may even be the same, but the targeted entity/object is completely up to the implementing container. Thus, the first container with the conventional web application may specify a particular target entity and the second container with the iOS native code may specify a different target entity, which may in turn retrieve and display different kinds of information and potentially take different actions, including rendering different kinds of a UI display.

In the case of the second container with the native iOS code, it may be that the target entity is another native iOS application, for instance, the user interface may be adapted to display a native profile which is pulled from, for example, Twitter™ or another appropriate source depending upon the functionality chosen.

With the third container having therein the community web site, the user may be in a forum type of discussion board and when the user clicks on the contact within their feed, an event may be fired up to the container for the community website which in turn causes the user interface to render a pop up confirming that the user interface will be moved away from the forum view as it is necessary to completely switch context to view the profile corresponding to the contact which was clicked on within the feed. The user may then confirm and the view is moved away from the context of the forum view and into the context of a profile view where the contact's profile page may be seen at the user's display.

Again, however, completely different actions may be taken via custom built containers, as the chosen functionality is not restricted to merely displaying contact profiles and clicking on contacts shared in a feed. For instance, the arbitrary application 265 may be developed to track NBA teams and the developer may elect to have entities corresponding to players, teams, leagues, coaches, etc., with each being a different entity type. Event definitions can further be made to cause the quarterback 365, which is generic from the perspective of the application developer, to carry out customized pivots and distributions of packaged events based on entity key prefixes or the entity types, at the discretion of the application developer.

Packaged events would then cause the quarterback 365 to pivot to a team page, or a player's page, or a coaches page, each of which may have different UI flows, layouts, skins, data displays, dashboards, etc.

The UI Framework 195 enables an n-way relationship with the arbitrary applications 265. The applications are arbitrary and are composed of building blocks created from the features which in turn are created from the components. Enabling the n-way application relationship results in a system with applications that support a variety of technologies while incorporating a mixture of functionality written by customer organizations, functionality written by partners, and functionality written by and provided by the host organization as a service to the customer organizations.

According to certain embodiments, the quarterback 365 includes partially generic code and partially application specific. Generic code of the quarterback 365 handles all the glue 260 entities. Application specific code of the quarterback 365 handles what is to be done with the specific entity. The Application specific code of the quarterback 365 and the actions it takes are called pivots and provide routing based on the actual context associated with the specific entity, and in particular, the context within which that specific entity operates, whether that is an iOS native application, an Android native application, a web-base HTML application, etc.

Collectively, the UI Framework 195 establishes a URI (Uniform Resource Identifier) platform which purposefully blurs the line between programmatic and declarative customization and additionally blurs the lines between code written by developers internal to the host organization and code that is written by customer organizations and simply hosted at the host organization on behalf of such customers. By blurring the line, maintenance of code is greatly simplified, especially within the ecosphere of the multi-tenant database of the host organization which supports and interacts with many different customer organizations or tenants simultaneously, each of whom have different needs in terms of functionality and information to be rendered to an end-user's UI.

The problem of code maintenance is not new, however, maintenance issues are further exacerbated within a multi-tenant environment. Consider the very simple example of a UI with a box on the left hand side, and the person responsible for the application wishes to move that box such that it is displayed on the right hand side instead. However, the IT persons that developed the template by which to display information may have only included the box on the left hand side without any option to display information on the right hand side. While a seemingly simple maintenance issue, the fact is that different persons are responsible for the kinds of information displayed versus the template which permits the application to display information. Using conventional content management solutions, it is necessary to engage somebody in IT and request that the IT support person move the box. Once the IT person takes up the request, the IT person goes to some other system, writes some code modifying or adding additional features into the template, deploys the code into production and in particular, into the conventional content management system, and magically the box now appears on the right hand side, as requested, or permits the person responsible for the information display to render information in the newly available box.

Conversely, the platform implementing the UI Framework 195 further provides a developers interface through which customer organizations may incorporate functional components and graphical components from an available tool box or pallet, for example, by dragging graphical and functional components onto a page being built. The developers interface additionally permits the customer organizations to link additional functionality to the graphical and functional components through extension points.

The UI Framework 195 presents a unified system with defined interactions which permits certain changes to be managed by the persons responsible for the application and information display, rather than having to engage back-end IT persons responsible for the underlying computing architecture. For instance, the UI Framework 195 enables customer organizations and their users to control and define what information is to be displayed, how that information is to be displayed visually to an end-user's device, what functionality is to be triggered or what entities/objects are to be instantiated pursuant to defined events, etc., all without having to engage the IT persons responsible for supporting the underlying computing architecture of the host organization.

This is especially important within a multi-tenant environment because there are a vast and varied array of customer organizations which utilize services provided by the host organization and the IT persons responsible for the computing architecture of the host organization and its multi-tenant environment lack the intimate knowledge of the information and business objectives associated with any particular customer organization. Additionally, removing IT support persons from the maintenance chain improves satisfaction by the customer organizations by enabling them to modify the UI aspects rather than being limited to controlling only what information is displayed by a restricted set of pre-established templates.

The overall implementation and use of the UI Framework 195 within the host organization 110 and the multi-tenant environment provides value to the customer organizations by permitting them to add their own arbitrary applications 265 and desired customizations as building blocks, resulting in a composition type system created partially by the customer organizations' developers and partially by the host organization's own developers.

Figure 4:
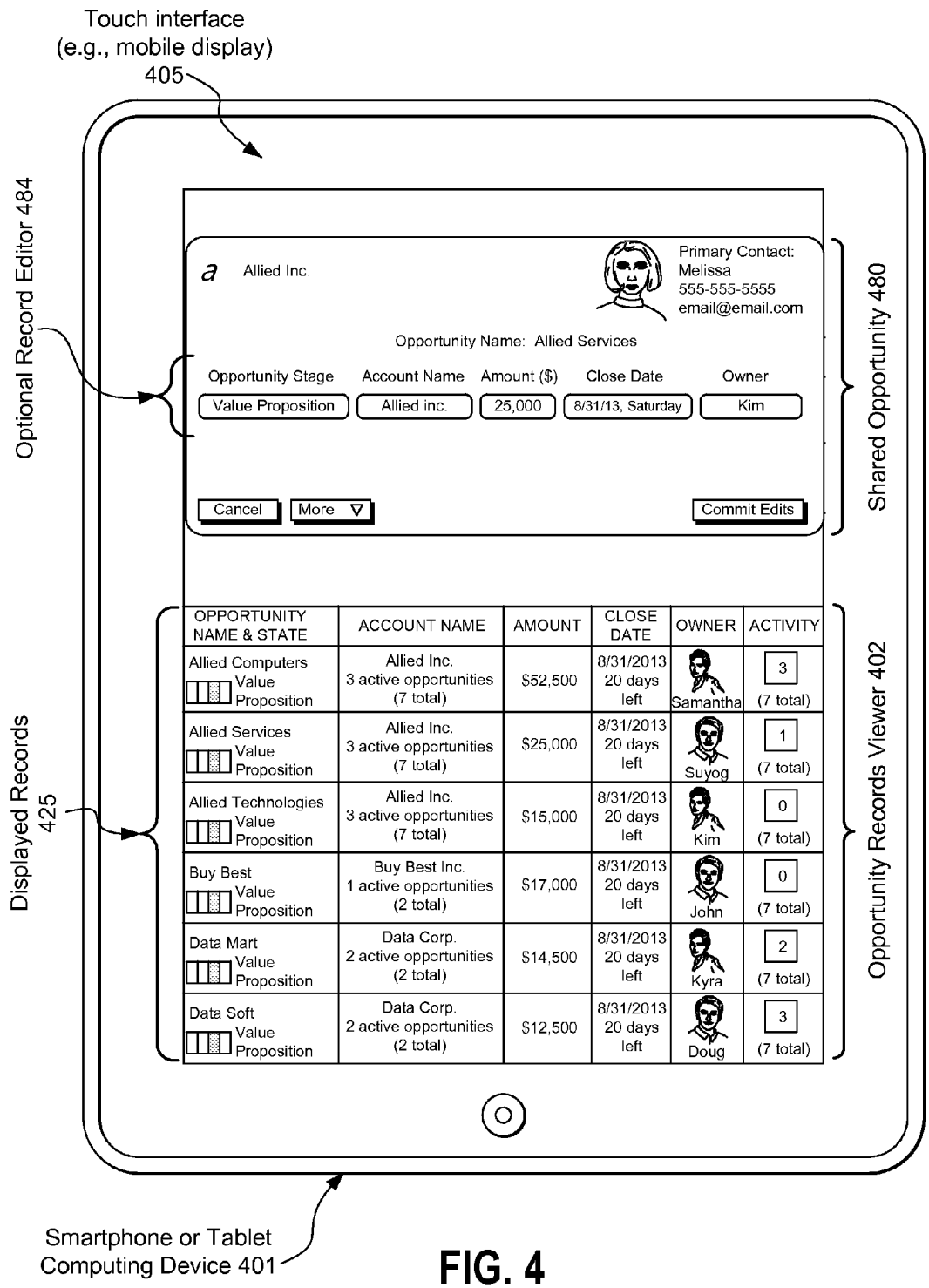
FIG. 4 depicts an exemplary graphical interface operating at a mobile, smartphone, or tablet computing device in accordance with the embodiments.

FIG. 4 depicts an exemplary graphical interface operating at a mobile, smartphone, or tablet computing device in accordance with the embodiments. In particular, there is depicted a smartphone or tablet computing device 401 having embodied therein a touch interface 405, such as a mobile display. Presented or depicted to the mobile display 405 is the opportunity record viewer 402 in which the records are depicted. For instance, a shared contact may be displayed, a shared contacts list, a shared opportunity 480, or a shared list of opportunities may be displayed to a user via the display. Additionally depicted is an optional record editor 484 from which a user can select one of the displayed records 425 from the opportunity record viewer 402 and then modify the selected record at the touch interface 405. Such features may be enabled via the components and features of the UI framework as described previously.

Figure 5A:
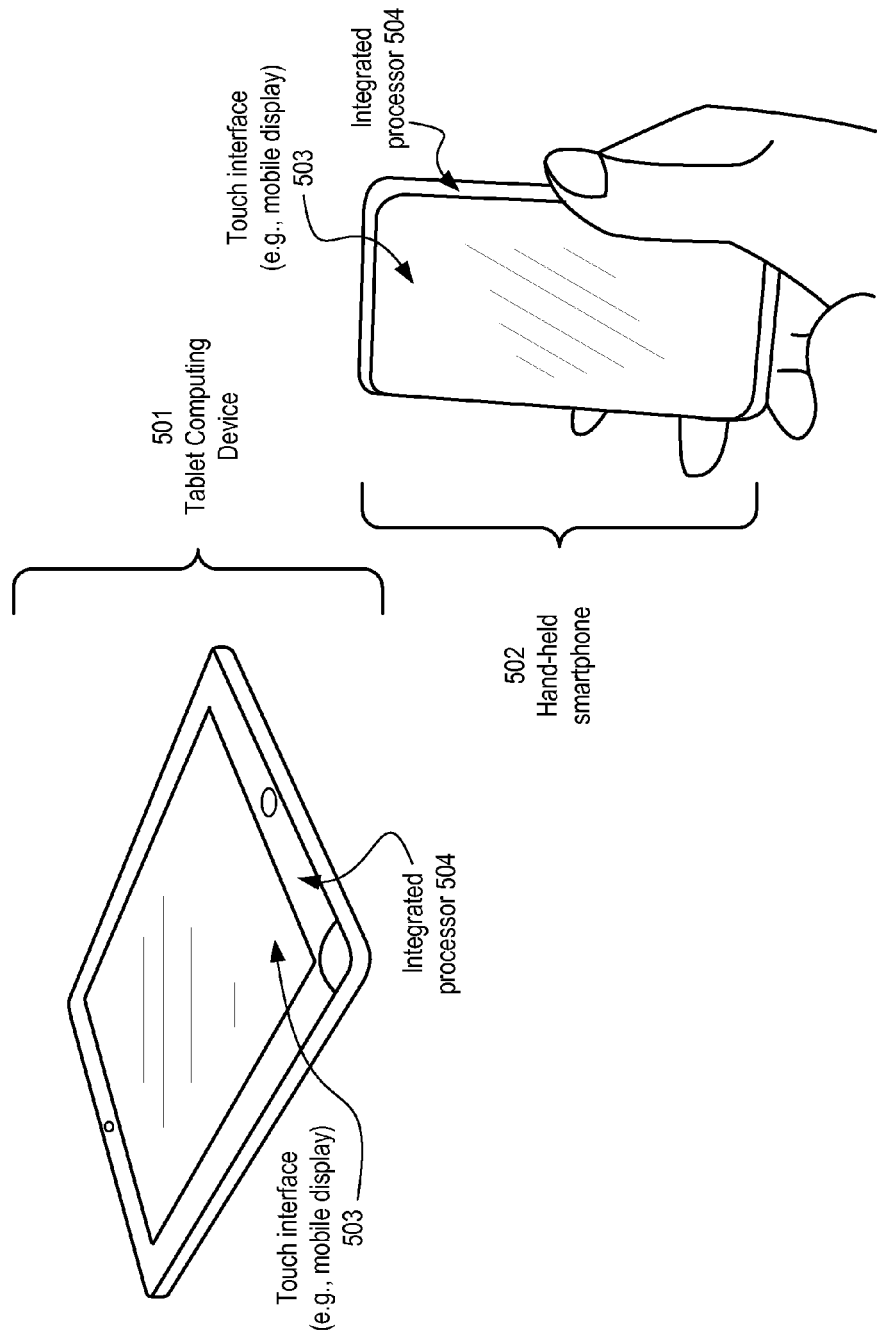
FIG. 5A depicts a tablet computing device and a handheld smartphone each having a circuitry integrated therein as described in accordance with the embodiments.

FIG. 5A depicts a tablet computing device 501 and a hand-held smartphone 502 each having a circuitry integrated therein as described in accordance with the embodiments. As depicted, each of the tablet computing device 501 and the hand-held smartphone 502 include a touch interface 503 (e.g., a touchscreen or touch sensitive display) and an integrated processor 504 in accordance with disclosed embodiments.

For example, in one embodiment, a system embodies a tablet computing device 501 or a hand-held smartphone 502, in which a display unit of the system includes a touchscreen interface 503 for the tablet or the smartphone and further in which memory and an integrated circuit operating as an integrated processor are incorporated into the tablet or smartphone, in which the integrated processor implements one or more of the embodiments described herein. In one embodiment, the integrated circuit described above or the depicted integrated processor of the tablet or smartphone is an integrated silicon processor functioning as a central processing unit (CPU) and/or a Graphics Processing Unit (GPU) for a tablet computing device or a smartphone.

Figure 5B:
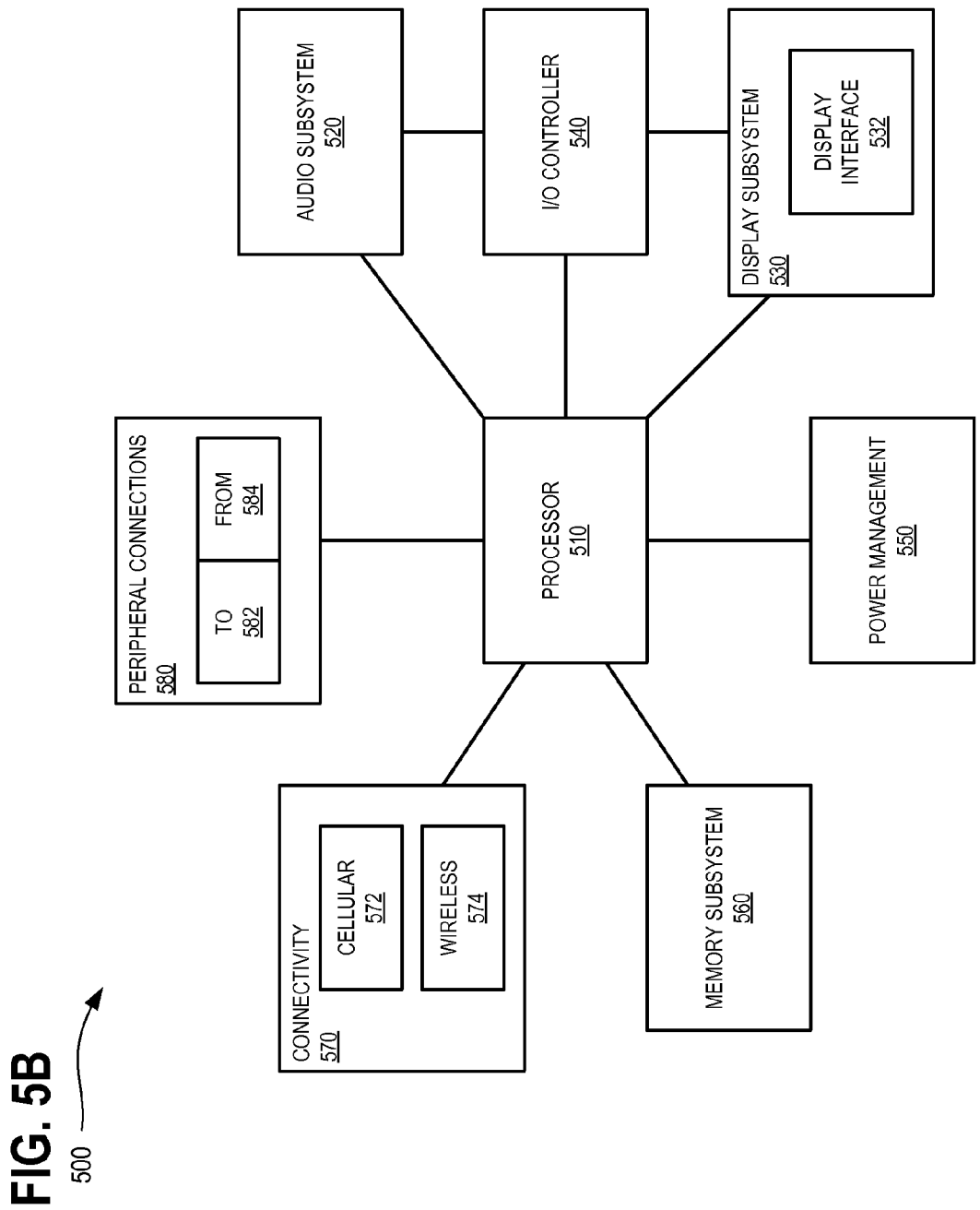
FIG. 5B is a block diagram of an embodiment of tablet computing device, a smart phone, or other mobile device in which touchscreen interface connectors are used.

FIG. 5B is a block diagram 500 of an embodiment of tablet computing device, a smart phone, or other mobile device in which touchscreen interface connectors are used. Processor 510 performs the primary processing operations. Audio subsystem 520 represents hardware (e.g., audio hardware and audio circuits) and software (e.g., drivers, codecs) components associated with providing audio functions to the computing device. In one embodiment, a user interacts with the tablet computing device or smart phone by providing audio commands that are received and processed by processor 510.

Display subsystem 530 represents hardware (e.g., display devices) and software (e.g., drivers) components that provide a visual and/or tactile display for a user to interact with the tablet computing device or smart phone. Display subsystem 530 includes display interface 532, which includes the particular screen or hardware device used to provide a display to a user. In one embodiment, display subsystem 530 includes a touchscreen device that provides both output and input to a user.

I/O controller 540 represents hardware devices and software components related to interaction with a user. I/O controller 540 can operate to manage hardware that is part of audio subsystem 520 and/or display subsystem 530. Additionally, I/O controller 540 illustrates a connection point for additional devices that connect to the tablet computing device or smart phone through which a user might interact. In one embodiment, I/O controller 540 manages devices such as accelerometers, cameras, light sensors or other environmental sensors, or other hardware that can be included in the tablet computing device or smart phone. The input can be part of direct user interaction, as well as providing environmental input to the tablet computing device or smart phone.

In one embodiment, the tablet computing device or smart phone includes power management 550 that manages battery power usage, charging of the battery, and features related to power saving operation. Memory subsystem 560 includes memory devices for storing information in the tablet computing device or smart phone. Connectivity 570 includes hardware devices (e.g., wireless and/or wired connectors and communication hardware) and software components (e.g., drivers, protocol stacks) to the tablet computing device or smart phone to communicate with external devices. Cellular connectivity 572 may include, for example, wireless carriers such as GSM (global system for mobile communications), CDMA (code division multiple access), TDM (time division multiplexing), or other cellular service standards). Wireless connectivity 574 may include, for example, activity that is not cellular, such as personal area networks (e.g., Bluetooth), local area networks (e.g., WiFi), and/or wide area networks (e.g., WiMax), or other wireless communication.

Peripheral connections 580 include hardware interfaces and connectors, as well as software components (e.g., drivers, protocol stacks) to make peripheral connections as a peripheral device ("to" 582) to other computing devices, as well as have peripheral devices ("from" 584) connected to the tablet computing device or smart phone, including, for example, a "docking" connector to connect with other computing devices. Peripheral connections 580 include common or standards-based connectors, such as a Universal Serial Bus (USB) connector, DisplayPort including MiniDisplayPort (MDP), High Definition Multimedia Interface (HDMI), Firewire, etc.

Figure 6:
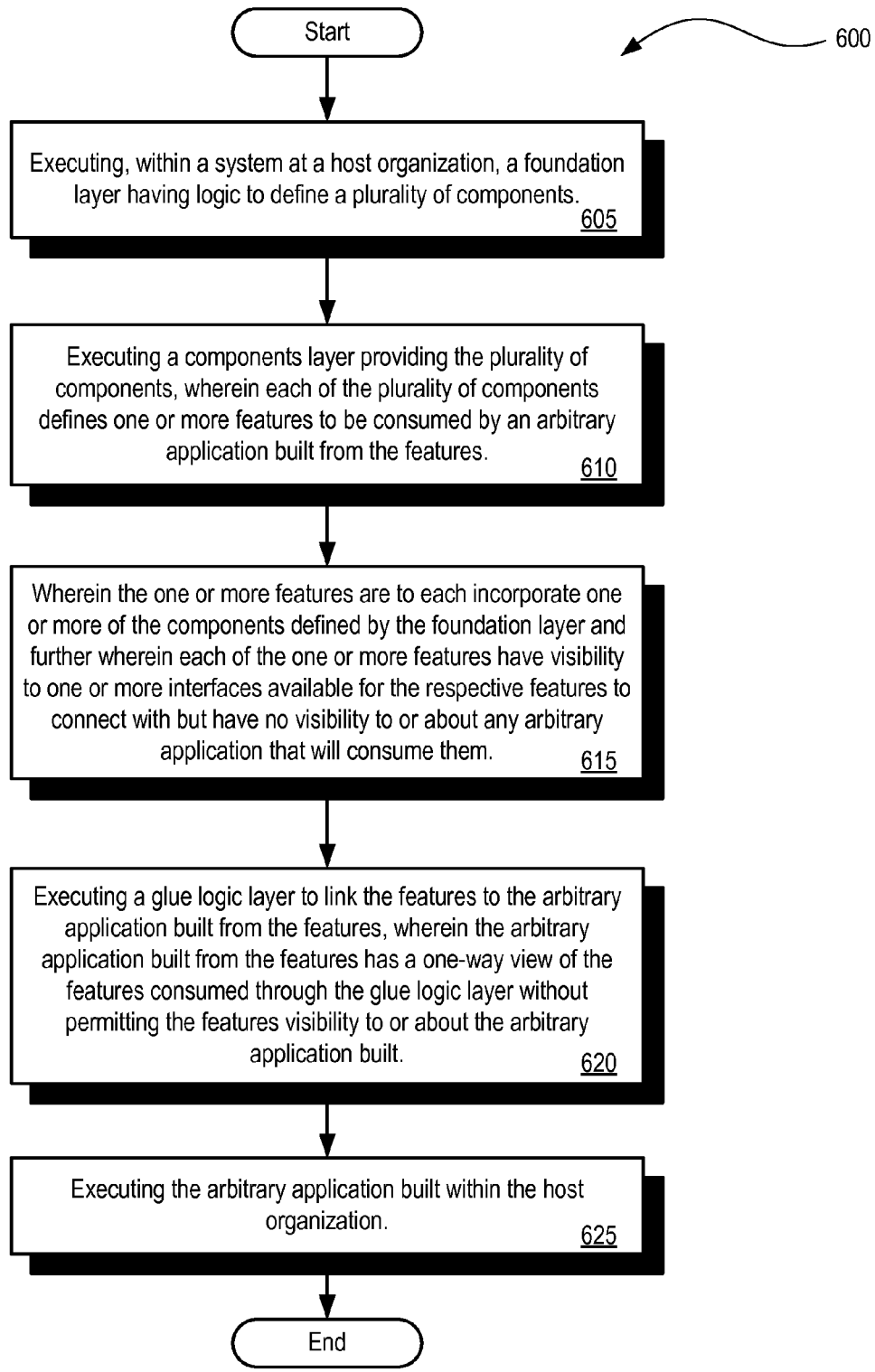
FIG. 6 is a flow diagram illustrating a method for implementing a uniform application user interface across a multi-tenant environment in accordance with disclosed embodiments.

FIG. 6 is a flow diagram illustrating a method 600 for implementing a uniform application user interface across a multi-tenant environment in accordance with disclosed embodiments. Method 600 may be performed by processing logic that may include hardware (e.g., circuitry, dedicated logic, programmable logic, microcode, etc.), software (e.g., instructions run on a processing device to perform various operations such as storing records, processing transactions, executing, providing, determining, linking, receiving, displaying, retrieving, communicating, updating, transmitting, sending, returning, etc., in pursuance of the systems, apparatuses, and methods, as described herein. For example, the computing architecture (e.g., within production environment 111) of host organization 110 as depicted at FIG. 1, the hand-held smartphone 502 or mobile tablet computing device 501 depicted at FIG. 5A, the machine 800 at FIG. 8, or the system 900 at FIG. 9, may implement the described methodologies. Some of the blocks and/or operations listed below are optional in accordance with certain embodiments. The numbering of the blocks presented is for the sake of clarity and is not intended to prescribe an order of operations in which the various blocks must occur.

At block 605, processing logic executes, within a system, a foundation layer having logic to define a plurality of components.

At block 610, processing logic executes a components layer providing the plurality of components, wherein each of the plurality of components defines one or more features to be consumed by an arbitrary application built from the features.

According to block 615, the one or more features are to each incorporate one or more of the components defined by the foundation layer and further in which each of the one or more features have visibility to one or more interfaces available for the respective features to connect with but have no visibility to or about any arbitrary application that will consume them.

At block 620, processing logic executes a glue logic layer to link the features to the arbitrary application built from the features, wherein the arbitrary application built from the features has a one-way view of the features consumed through the glue logic layer without permitting the features visibility to or about the arbitrary application built.

At block 625, processing logic executes the arbitrary application built within the multi-tenant environment.

In accordance with another embodiment of method 600, the interfaces available for the respective features each establishes a series of events that the features are allowed to utilize.

In accordance with another embodiment, method 600 further includes executing a quarterback within the glue logic layer, the quarterback receiving the events utilized by the features, wherein the quarterback determines where the received events go.

In accordance with a particular embodiment, there is non-transitory computer readable storage media having instructions stored thereon that, when executed by a processor of a system, the instructions cause the system to perform operations including: executing a foundation layer having logic to define a plurality of components; executing a components layer providing the plurality of components, wherein each of the plurality of components defines one or more features to be consumed by an arbitrary application built from the features; wherein the one or more features are to each incorporate one or more of the components defined by the foundation layer and further wherein each of the one or more features have visibility to one or more interfaces available for the respective features to connect with but have no visibility to or about any arbitrary application that will consume them; executing a glue logic layer to link the features to the arbitrary application built from the features, wherein the arbitrary application built from the features has a one-way view of the features consumed through the glue logic layer without permitting the features visibility to or about the arbitrary application built; and executing the arbitrary application built within the multi-tenant environment.

Figure 7A:
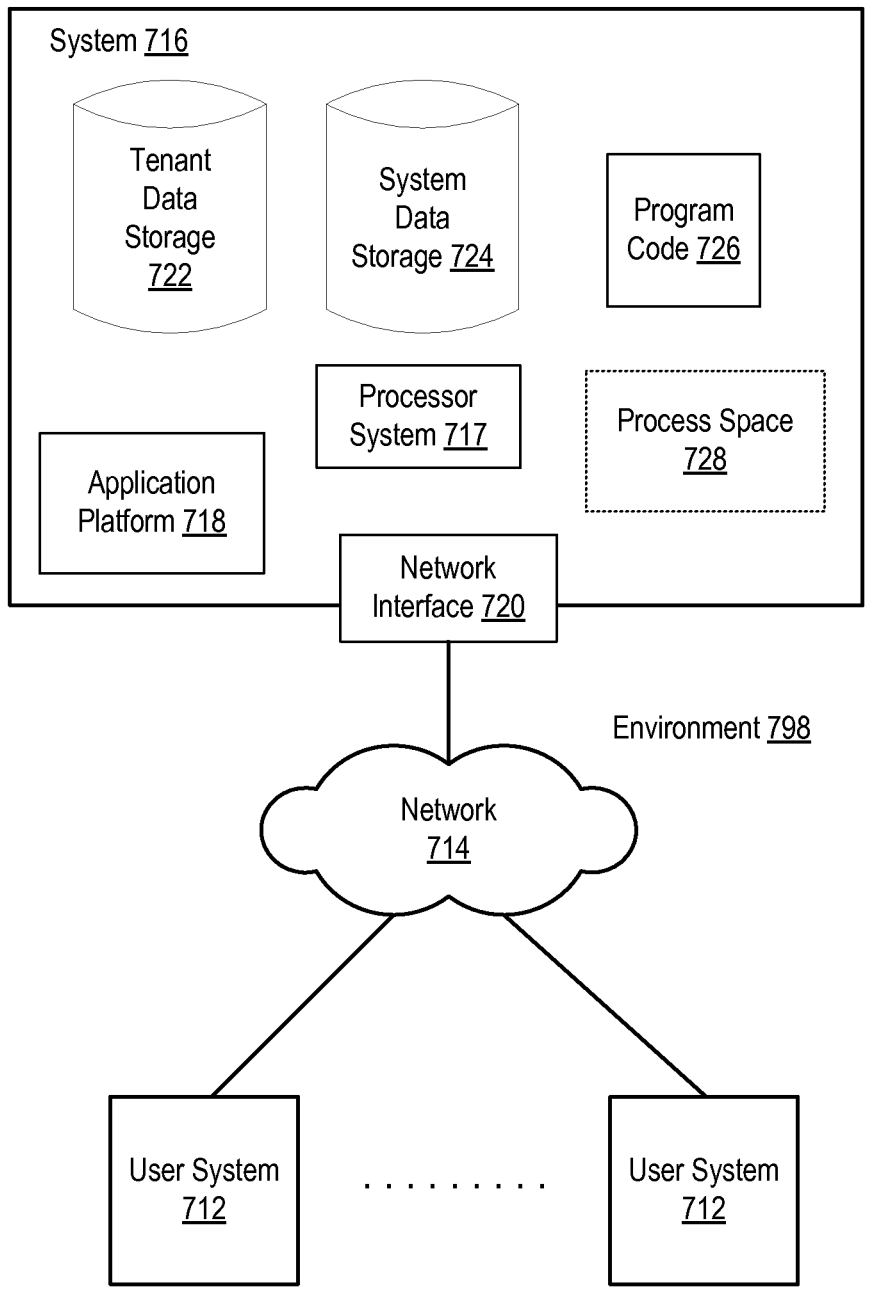
FIG. 7A illustrates a block diagram of an environment in which an on-demand database service may operate in accordance with the described embodiments.

FIG. 7A illustrates a block diagram of an environment 798 in which an on-demand database service may operate in accordance with the described embodiments. Environment 798 may include user systems 712, network 714, system 716, processor system 717, application platform 718, network interface 720, tenant data storage 722, system data storage 724, program code 726, and process space 728. In other embodiments, environment 798 may not have all of the components listed and/or may have other elements instead of, or in addition to, those listed above.

Environment 798 is an environment in which an on-demand database service exists. User system 712 may be any machine or system that is used by a user to access a database user system. For example, any of user systems 712 can be a handheld computing device, a mobile phone, a laptop computer, a work station, and/or a network of computing devices. As illustrated in FIG. 7A (and in more detail in FIG. 7B) user systems 712 might interact via a network 714 with an on-demand database service, which is system 716.

An on-demand database service, such as system 716, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 716" and "system 716" is used interchangeably herein. A database image may include one or more database objects. A relational database management system (RDMS) or the equivalent may execute storage and retrieval of information against the database object(s). Application platform 718 may be a framework that allows the applications of system 716 to run, such as the hardware and/or software, e.g., the operating system. In an embodiment, on-demand database service 716 may include an application platform 718 that enables creation, managing and executing one or more applications developed by the provider of the on-demand database service, users accessing the on-demand database service via user systems 712, or third party application developers accessing the on-demand database service via user systems 712.

The users of user systems 712 may differ in their respective capacities, and the capacity of a particular user system 712 might be entirely determined by permissions (permission levels) for the current user. For example, where a salesperson is using a particular user system 712 to interact with system 716, that user system has the capacities allotted to that salesperson. However, while an administrator is using that user system to interact with system 716, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 714 is any network or combination of networks of devices that communicate with one another. For example, network 714 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it is understood that the networks that the claimed embodiments may utilize are not so limited, although TCP/IP is a frequently implemented protocol.

User systems 712 might communicate with system 716 using TCP/IP and, at a higher network level, use other common Internet protocols to communicate, such as HTTP, FTP, AFS, WAP, etc. In an example where HTTP is used, user system 712 might include an HTTP client commonly referred to as a "browser" for sending and receiving HTTP messages to and from an HTTP server at system 716. Such an HTTP server might be implemented as the sole network interface between system 716 and network 714, but other techniques might be used as well or instead. In some implementations, the interface between system 716 and network 714 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 716, shown in FIG. 7A, implements a web-based customer relationship management (CRM) system. For example, in one embodiment, system 716 includes application servers configured to implement and execute CRM software applications as well as provide related data, code, forms, webpages and other information to and from user systems 712 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 716 implements applications other than, or in addition to, a CRM application. For example, system 716 may provide tenant access to multiple hosted (standard and custom) applications, including a CRM application. User (or third party developer) applications, which may or may not include CRM, may be supported by the application platform 718, which manages creation, storage of the applications into one or more database objects and executing of the applications in a virtual machine in the process space of the system 716.

One arrangement for elements of system 716 is shown in FIG. 7A, including a network interface 720, application platform 718, tenant data storage 722 for tenant data 723, system data storage 724 for system data 725 accessible to system 716 and possibly multiple tenants, program code 726 for implementing various functions of system 716, and a process space 728 for executing MTS system processes and tenant-specific processes, such as running applications as part of an application hosting service. Additional processes that may execute on system 716 include database indexing processes.

Several elements in the system shown in FIG. 7A include conventional, well-known elements that are explained only briefly here. For example, each user system 712 may include a desktop personal computer, workstation, laptop, PDA, cell phone, or any wireless access protocol (WAP) enabled device or any other computing device capable of interfacing directly or indirectly to the Internet or other network connection. User system 712 typically runs an HTTP client, e.g., a browsing program, such as Microsoft's Internet Explorer browser, a Mozilla or Firefox browser, an Opera, or a WAP-enabled browser in the case of a smartphone, tablet, PDA or other wireless device, or the like, allowing a user (e.g., subscriber of the multi-tenant database system) of user system 712 to access, process and view information, pages and applications available to it from system 716 over network 714. Each user system 712 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 716 or other systems or servers. For example, the user interface device can be used to access data and applications hosted by system 716, and to perform searches on stored data, and otherwise allow a user to interact with various GUI pages that may be presented to a user. As discussed above, embodiments are suitable for use with the Internet, which refers to a specific global internetwork of networks. However, it is understood that other networks can be used instead of the Internet, such as an intranet, an extranet, a virtual private network (VPN), a non-TCP/IP based network, any LAN or WAN or the like.

According to one embodiment, each user system 712 and all of its components are operator configurable using applications, such as a browser, including computer code run using a central processing unit such as an Intel Pentium® processor or the like. Similarly, system 716 (and additional instances of an MTS, where more than one is present) and all of their components might be operator configurable using application(s) including computer code to run using a central processing unit such as processor system 717, which may include an Intel Pentium® processor or the like, and/or multiple processor units.

According to one embodiment, each system 716 is configured to provide webpages, forms, applications, data and media content to user (client) systems 712 to support the access by user systems 712 as tenants of system 716. As such, system 716 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS may include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It is understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 7B:
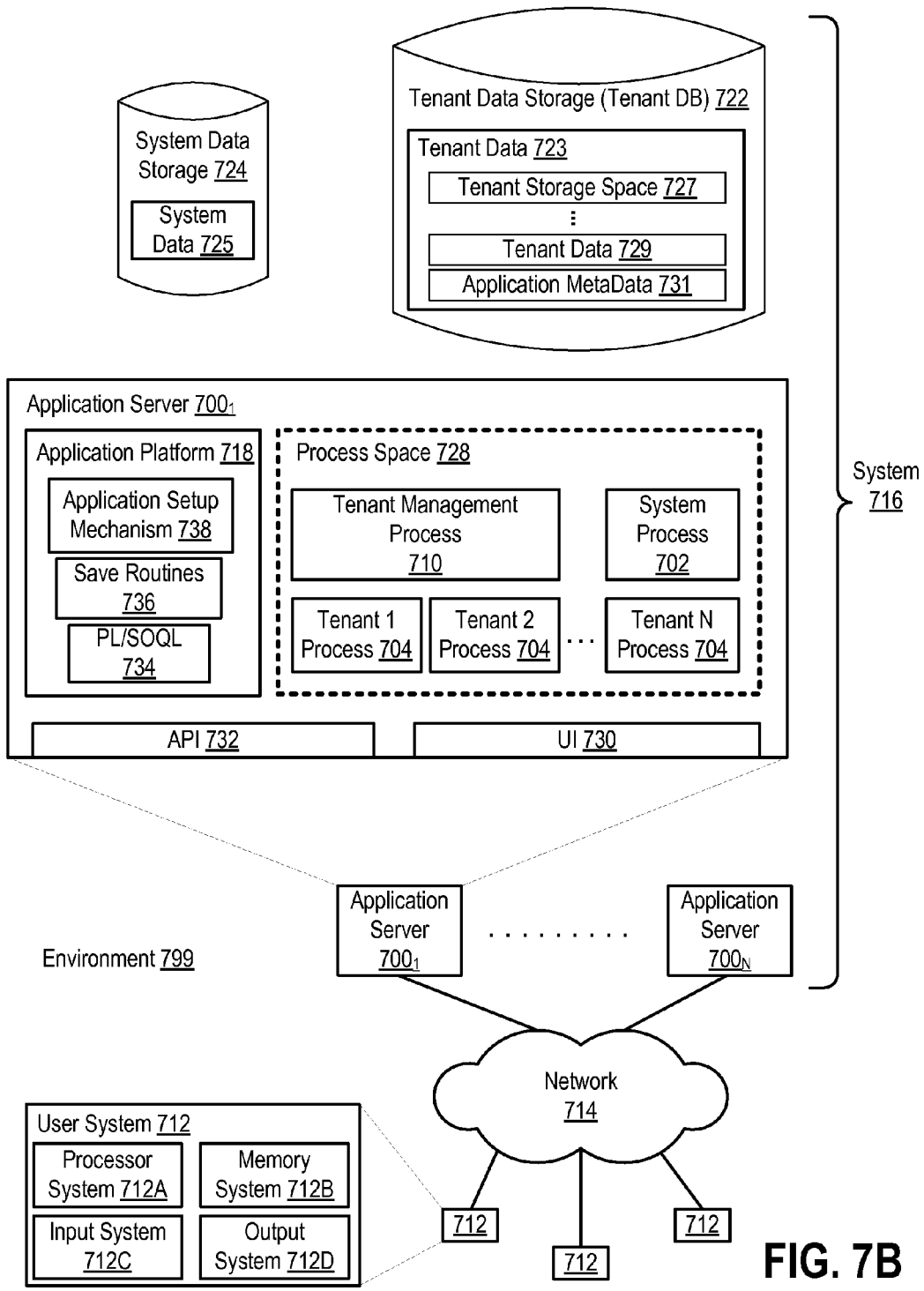
FIG. 7B illustrates another block diagram of an embodiment of elements of FIG. 7A and various possible interconnections between such elements in accordance with the described embodiments.

FIG. 7B illustrates another block diagram of an embodiment of elements of FIG. 7A and various possible interconnections between such elements in accordance with the described embodiments. FIG. 7B also illustrates environment 799. However, in FIG. 7B, the elements of system 716 and various interconnections in an embodiment are illustrated in further detail. More particularly, FIG. 7B shows that user system 712 may include a processor system 712A, memory system 712B, input system 712C, and output system 712D. FIG. 7B shows network 714 and system 716. FIG. 7B also shows that system 716 may include tenant data storage 722, having therein tenant data 723, which includes, for example, tenant storage space 727, tenant data 729, and application metadata 731. System data storage 724 is depicted as having therein system data 725. Further depicted within the expanded detail of application servers $700_{1-N}$ are User Interface (UI) 730, Application Program Interface (API) 732, application platform 718 includes PL/SOQL 734, save routines 736, application setup mechanism 738, process space 728 includes system process space 702, tenant 1-N process spaces 704, and tenant management process space 710. In other embodiments, environment 799 may not have the same elements as those listed above and/or may have other elements instead of, or in addition to, those listed above.

User system 712, network 714, system 716, tenant data storage 722, and system data storage 724 were discussed above in FIG. 7A. As shown by FIG. 7B, system 716 may include a network interface 720 (of FIG. 7A) implemented as a set of HTTP application servers 700, an application platform 718, tenant data storage 722, and system data storage 724. Also shown is system process space 702, including individual tenant process spaces 704 and a tenant management process space 710. Each application server 700 may be configured to tenant data storage 722 and the tenant data 723 therein, and system data storage 724 and the system data 725 therein to serve requests of user systems 712. The tenant data 723 might be divided into individual tenant storage areas (e.g., tenant storage space 727), which can be either a physical arrangement and/or a logical arrangement of data. Within each tenant storage space 727, tenant data 729, and application metadata 731 might be similarly allocated for each user. For example, a copy of a user's most recently used (MRU) items might be stored to tenant data 729. Similarly, a copy of MRU items for an entire organization that is a tenant might be stored to tenant storage space 727. A UI 730 provides a user interface and an API 732 provides an application programmer interface into system 716 resident processes to users and/or developers at user systems 712. The tenant data and the system data may be stored in various databases, such as one or more Oracle™ databases.

Application platform 718 includes an application setup mechanism 738 that supports application developers' creation and management of applications, which may be saved as metadata into tenant data storage 722 by save routines 736 for execution by subscribers as one or more tenant process spaces 704 managed by tenant management process space 710 for example. Invocations to such applications may be coded using PL/SOQL 734 that provides a programming language style interface extension to API 732. Invocations to applications may be detected by one or more system processes, which manages retrieving application metadata 731 for the subscriber making the invocation and executing the metadata as an application in a virtual machine.

Each application server 700 may be communicably coupled to database systems, e.g., having access to system data 725 and tenant data 723, via a different network connection. For example, one application server $700_1$ might be coupled via the network 714 (e.g., the Internet), another application server $700_{N-1}$ might be coupled via a direct network link, and another application server $700_N$ might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer) is communicably coupled between the application servers 700 and the user systems 712 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user may hit three different application servers 700, and three requests from different users may hit the same application server 700. In this manner, system 716 is multi-tenant, in which system 716 handles storage of, and access to, different objects, data and applications across disparate users and organizations.

As an example of storage, one tenant might be a company that employs a sales force where each salesperson uses system 716 to manage their sales process. Thus, a user might maintain contact data, leads data, customer follow-up data, performance data, goals and progress data, etc., all applicable to that user's personal sales process (e.g., in tenant data storage 722). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 716 that are allocated at the tenant level while other data structures might be managed at the user level. Because an MTS might support multiple tenants including possible competitors, the MTS may have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 716 might also maintain system level data usable by multiple tenants or other data. Such system level data might include industry reports, news, postings, and the like that are sharable among tenants.

In certain embodiments, user systems 712 (which may be client systems) communicate with application servers 700 to request and update system-level and tenant-level data from system 716 that may require sending one or more queries to tenant data storage 722 and/or system data storage 724. System 716 (e.g., an application server 700 in system 716) automatically generates one or more SQL statements (e.g., one or more SQL queries) that are designed to access the desired information. System data storage 724 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects as described herein. It is understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It is understood that the word "entity" may also be used interchangeably herein with "object" and "table."

In some multi-tenant database systems, tenants may be allowed to create and store custom objects, or they may be allowed to customize standard entities or objects, for example by creating custom fields for standard objects, including custom index fields. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

FIG. 8 illustrates a diagrammatic representation of a machine 800 in the exemplary form of a computer system, in accordance with one embodiment, within which a set of instructions, for causing the machine/computer system 800 to perform any one or more of the methodologies discussed herein, may be executed. In alternative embodiments, the machine may be connected (e.g., networked) to other machines in a Local Area Network (LAN), an intranet, an extranet, or the public Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 800 includes a processor 802, a main memory 804 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 818 (e.g., a persistent storage device including hard disk drives and a persistent database and/or a multi-tenant database implementation), which communicate with each other via a bus 830. Main memory 804 includes a UI Framework 824 to implement the mechanisms described herein, such as the foundational layer, providing components, features, the glue logic layer, and so forth. Arbitrary application 823 also of main memory 804 may be created or developed by the consumption of various features and their components as provided by the UI Framework 824. Main memory 804 and its sub-elements are operable in conjunction with processing logic 826 and processor 802 to perform the methodologies discussed herein. The computer system 800 may additionally or alternatively embody the server side elements as described above.

Processor 802 represents one or more general-purpose processing devices such as a microprocessor, central processing unit, or the like. More particularly, the processor 802 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 802 may also be one or more special-purpose processing devices such as an application specific integrated circuit (ASIC), a field programmable gate array (FPGA), a digital signal processor (DSP), network processor, or the like. Processor 802 is configured to execute the processing logic 826 for performing the operations and functionality which is discussed herein.

The computer system 800 may further include a network interface card 808. The computer system 800 also may include a user interface 810 (such as a video display unit, a liquid crystal display (LCD), or a cathode ray tube (CRT)), an alphanumeric input device 812 (e.g., a keyboard), a cursor control device 814 (e.g., a mouse), and a signal generation device 816 (e.g., an integrated speaker). The computer system 800 may further include peripheral device 836 (e.g., wireless or wired communication devices, memory devices, storage devices, audio processing devices, video processing devices, etc.).

The secondary memory 818 may include a non-transitory machine-readable storage medium or a non-transitory computer readable storage medium or a non-transitory machine-accessible storage medium 831 on which is stored one or more sets of instructions (e.g., software 822) embodying any one or more of the methodologies or functions described herein. The software 822 may also reside, completely or at least partially, within the main memory 804 and/or within the processor 802 during execution thereof by the computer system 800, the main memory 804 and the processor 802 also constituting machine-readable storage media. The software 822 may further be transmitted or received over a network 820 via the network interface card 808.

Figure 9:
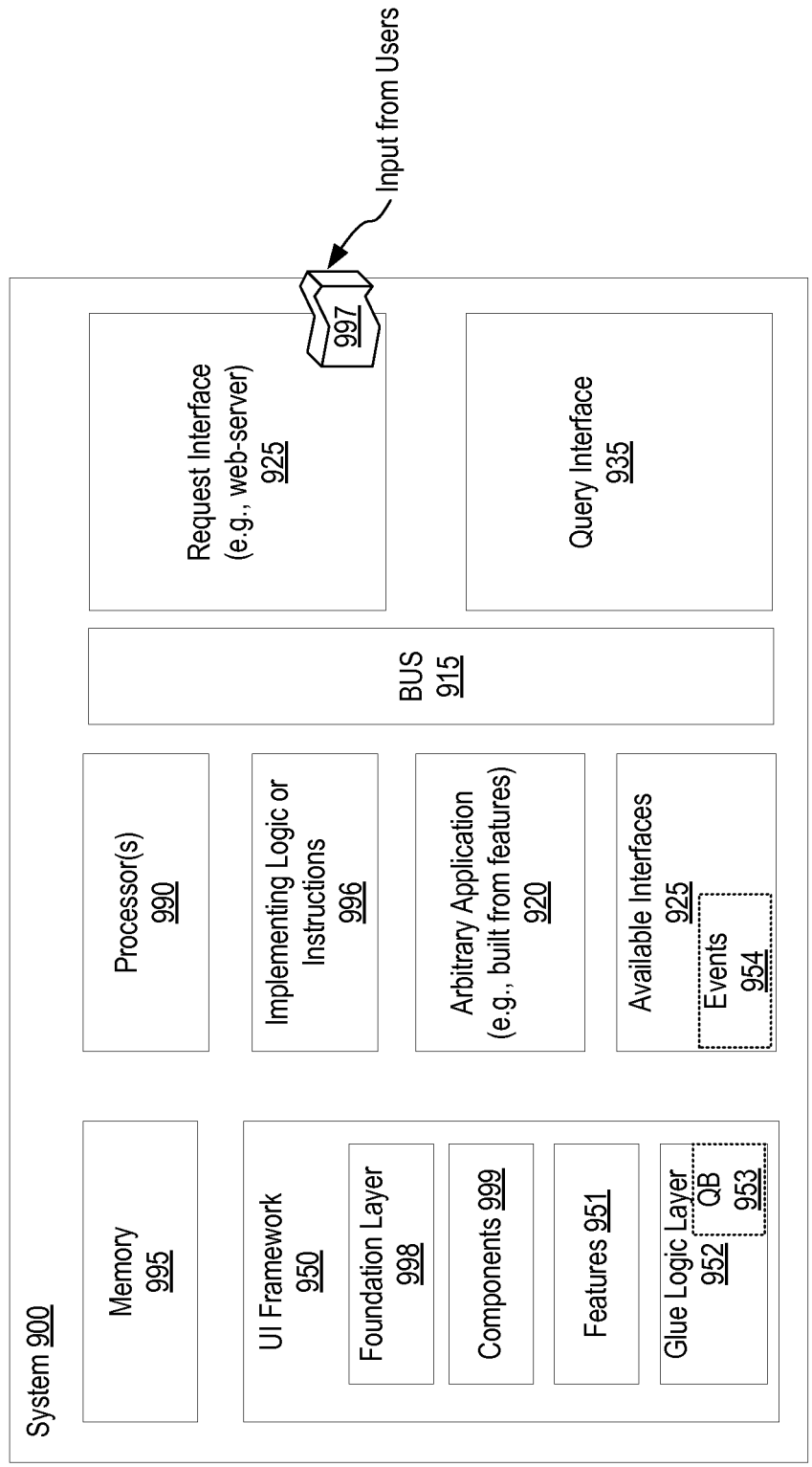
FIG. 9 shows a diagrammatic representation of a system in accordance with which embodiments may operate, be installed, integrated, or configured.

FIG. 9 shows a diagrammatic representation of a system 900 in which embodiments may operate, be installed, integrated, or configured.

In accordance with one embodiment, there is a system 900 having at least a processor 990 and a memory 995 therein to execute implementing logic and/or instructions 996. Such a system 900 executes as a part of a hosted computing environment, such as an on-demand or cloud computing environment which utilizes multi-tenant database technologies, client-server technologies, traditional database technologies, or other computing architecture in support of the hosted computing environment.

According to the depicted embodiment, the system 900 may implement a UI Framework 950. For instance, the system 900 implementing such a UI Framework 950 includes a foundation layer 998 to define a plurality of components 999; the plurality of components 999 each to define one or more features 951 to be consumed by an arbitrary application 920 built from the features 951; in which the one or more features 951 are to each incorporate one or more of the components 999 defined by the foundation layer 998 and further in which each of the one or more features 951 have visibility to one or more interfaces 925 available for the respective features 951 to connect with but have no visibility to or about any arbitrary application 920 that will consume them. A glue logic layer 952 of the system is to further link the features 951 to the arbitrary application 920 built from the features 951, in which the arbitrary application 920 built from the features 951 has a one-way view of the features consumed through the glue logic layer 952 without permitting the features 951 visibility to or about the arbitrary application 920 built; and further in which the arbitrary application 920 built from the features 951 is to execute within the host organization.

According to another embodiment of the system 900, the interfaces 925 available for the respective features establish a series of events 954 that the features are allowed to utilize.

According to another embodiment, the system 900 further includes a quarterback 953 to receive the events 954 utilized by the features, in which the quarterback 953 determines where the received events are routed.

According to another embodiment of the system 900, the quarterback 953 resides within the glue logic layer 952 and routes the events 954 based upon context of the arbitrary application 920 built from the features 951 when executing within the host organization.

According to another embodiment of the system 900, the events 954 are provided by a host organization which implements the system 900 or defined by customer organizations and/or partners via extensions; and further in which the events are utilized by the features.

According to another embodiment of the system 900, the features 951 constitute tangible or perceivable elements directly viewable by users of the arbitrary applications without being specific or exclusive to any particular arbitrary application.

According to another embodiment of the system 900, each feature 951 constitutes one of: a picture; an image; a user profile; a feed; a contact; or a contacts list.

According to another embodiment of the system 900, the glue logic layer 952 provides a connection between the plurality of components 999 which operate in a decentralized manner and further allows customer organizations to create a cohesive link between features 951 chosen by the customer organizations for the arbitrary application 920 built without incurring unwanted coupling between the arbitrary application built and the features by forcing the link through the glue logic layer rather than rather than bi-directionally between the features and the arbitrary application built.

According to another embodiment of the system 900, a host organization implements the system; and in which a customer organization develops the arbitrary application built from the features to execute within the host organization.

According to another embodiment of the system 900, the customer organization causes the arbitrary application built from the features to execute within the host organization on behalf of a plurality of users affiliated with the customer organization; and in which the arbitrary application built from the features presents a graphical user interface to the users to provide output and receive input.

According to another embodiment of the system 900, the foundation layer defines a set of rules and events that each of the plurality of components must adhere to without defining functionality of the respective components.

According to another embodiment of the system 900, the foundation layer includes implementing logic by which customer organizations, partners, and/or internal developers to a host organization which implements the system and the host organization specify what any one of the plurality of components does.

According to another embodiment of the system 900, the foundation layer further provides the plurality of components with access to information stored within a multi-tenant database system of the host organization.

According to another embodiment of the system 900, the foundation layer further provides the plurality of components with access to information sources accessible external from the host organization including one or more of social network feeds, shipping status from third party shippers, news feeds, and data sources maintained by partners external to the host organization.

According to another embodiment of the system 900, each one of the plurality of components include a re-usable component having executable code therein to be consumed and reused by any one or more of the features.

According to another embodiment of the system 900, each of the one or more features includes a grouping of a the re-usable components as building blocks utilized to create each of the one or more features.

According to another embodiment of the system 900, each one of the plurality of components include one of: a host organization component developed by the host organization and provided to customer organizations as a service; a custom developed component by one of the customer organizations and hosted by the host organization on behalf of the respective customer organization; and an externally developed partner or service provider component provided for use by the customer organizations at the system within the host organization.

According to another embodiment of the system 900, each component provides graphical user elements that may be placed upon a screen or display of a user's device when executing the arbitrary application.

According to another embodiment, the system 900 further includes a web-server to implement a request interface 925 to receive input from users 997 of the arbitrary application 920 built during execution via a graphical user interface presented to user-devices by the arbitrary application built.

According to another embodiment of the system 900, the input from users includes input from one of a plurality of customer organizations remote from the system; in which the plurality of customer organizations communicably interface with the system via a public Internet; and in which each customer organization is an entity selected from the group consisting of: a separate and distinct remote organization, an organizational group within the host organization, a business partner of the host organization, or a customer organization that subscribes to cloud computing services provided by the host organization.

According to another embodiment of the system 900, a user interface operates at a user client device remote from the system and communicatively interfaces with the system via a public Internet; in which the system operates at a host organization as a cloud based service provider to the user client device; and in which the cloud based service provider hosts the arbitrary application built within the host organization on behalf of a customer organization which is a tenant of the host organization and makes the arbitrary application built accessible to authorized users affiliated with the customer organization.

According to another embodiment, the system 900 is embodied within one of a tablet computing device or a hand-held smartphone such as those depicted at FIGS. 5A and 5B.

Bus 915 interfaces the various components of the system 900 amongst each other, with any other peripheral(s) of the system 900, and with external components such as external network elements, other machines, client devices, etc., including communicating with such external devices via a network interface over a LAN, WAN, or the public Internet. Query interface 935 provides functionality to pass queries from the request interface (e.g., web-server) 925 into a multi-tenant database system for execution against its databases or other data stores of the host organization's production environment as depicted in additional detail at FIG. 1.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims are to be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A system to execute within a host organization, wherein the system comprises:
   a processor and a memory to execute instructions at the system;
   a foundation layer to define a plurality of components;
   the plurality of components, each to define one or more features to be consumed by an arbitrary application built from the features;
   wherein the one or more features are to each incorporate one or more of the components defined by the foundation layer;
   each of the one or more features to have visibility to one or more interfaces available for the respective features which permit each of the respective one or more features to connect with the one or more interfaces available to the respective features while preventing the respective one or more features from being visible to any arbitrary application that is to consume the arbitrary application;
   a glue logic layer to link each of the respective one or more features to the arbitrary application built from the features;
   wherein the arbitrary application built from the features has a one-way view of the features consumed through the glue logic layer without permitting the features to be visible to the arbitrary application built;
   a container, wherein the container defines an interaction model of the arbitrary application and adopts specified features, glue logic and a quarterback, wherein the quarterback is incorporated by and interfaces with the glue logic and provides defined requirements that establish governance of the container; and
   wherein the arbitrary application built from the features is to execute within the host organization.

2. The system of claim 1, wherein the interfaces available for the respective features establish a series of events that the features are allowed to utilize.

3. The system of claim 2, further comprising:
   a quarterback to receive the events utilized by the features, wherein the quarterback determines where the received events are routed.

4. The system of claim 3, wherein the quarterback resides within the glue logic layer and routes the events based upon context of the arbitrary application built from the features when executing within the host organization.

5. The system of claim 2:
wherein the events are provided by the host organization which implements the system or defined by customer organizations and/or partners via extensions; and
wherein the events are utilized by the features.

6. The system of claim 1, wherein the features constitute tangible or perceivable elements directly viewable by users of the arbitrary applications without being specific or exclusive to any particular arbitrary application.

7. The system of claim 6, wherein each feature constitutes one of:
a picture;
an image;
a user profile;
a feed;
a contact; or
a contacts list.

8. The system of claim 1, wherein the glue logic layer provides a connection between the plurality of components which operate in a decentralized manner and further allows customer organizations to create a cohesive link between features chosen by the customer organizations for the arbitrary application built without incurring unwanted coupling between the arbitrary application built and the features by forcing the link through the glue logic layer rather than rather than bi-directionally between the features and the arbitrary application built.

9. The system of claim 1:
wherein the host organization implements the system; and
wherein a customer organization develops the arbitrary application built from the features to execute within the host organization.

10. The system of claim 9:
wherein the customer organization causes the arbitrary application built from the features to execute within the host organization on behalf of a plurality of users affiliated with the customer organization; and
wherein the arbitrary application built from the features presents a graphical user interface to the users to provide output and receive input.

11. The system of claim 1, wherein the foundation layer defines a set of rules and events that each of the plurality of components must adhere to without defining functionality of the respective components.

12. The system of claim 1, wherein the foundation layer includes implementing logic by which customer organizations, partners, and/or internal developers to a host organization which implements the system and the host organization specify what any one of the plurality of components does.

13. The system of claim 1, wherein the foundation layer further provides the plurality of components with access to information stored within a multi-tenant database system of the host organization.

14. The system of claim 1, wherein the foundation layer further provides the plurality of components with access to information sources accessible external from the host organization including one or more of social network feeds, shipping status from third party shippers, news feeds, and data sources maintained by partners external from the host organization.

15. The system of claim 1, wherein each one of the plurality of components comprise a re-usable component having executable code therein to be consumed and reused by any one or more of the features.

16. The system of claim 15, wherein each of the one or more features comprises a grouping of the re-usable components as building blocks utilized to create each of the one or more features.

17. The system of claim 1, wherein each one of the plurality of components comprise one of:
a host organization component developed and provided by the host organization to customer organizations as a service;
a custom developed component by one of the customer organizations and hosted by the host organization on behalf of the respective customer organization; and
an externally developed partner or service provider component provided for use by the customer organizations within the system at the host organization.

18. The system of claim 17, wherein each component provides graphical user elements that may be placed upon a screen or display of a user's device when executing the arbitrary application.

19. The system of claim 1, further comprising:
a web-server to implement a request interface to receive input from users of the arbitrary application built during execution via a graphical user interface presented to user-devices by the arbitrary application built.

20. The system of claim 19:
wherein the input from users comprises input from one of a plurality of customer organizations remote from the system;
wherein the plurality of customer organizations communicably interface with the system via a public Internet; and
wherein each customer organization is an entity selected from the group consisting of: a separate and distinct remote organization, an organizational group within the host organization, a business partner of the host organization, or a customer organization that subscribes to cloud computing services provided by the host organization.

21. The system of claim 1:
wherein a user interface operates at a user client device remote from the system and communicatively interfaces with the system via a public Internet;
wherein the system operates at a host organization as a cloud based service provider to the user client device; and
wherein the cloud based service provider hosts the arbitrary application built within the host organization on behalf of a customer organization which is a tenant of the host organization and makes the arbitrary application built accessible to authorized users affiliated with the customer organization.

22. A method executing within a system of a host organization, the system having a processor and a memory therein to execute instructions within the system, wherein the method comprises:
executing a foundation layer having logic to define a plurality of components;
executing a components layer providing the plurality of components, wherein each of the plurality of components defines one or more features to be consumed by an arbitrary application built from the features;
wherein the one or more features are to each incorporate one or more of the components defined by the foundation layer and further wherein each of the one or more features have visibility to one or more interfaces available for the respective features which permit each of the respective one or more features to connect with the one or more interfaces available to the respective features while preventing the respective one or more features from being visible to any arbitrary application that consumes the arbitrary application;

executing a glue logic layer to link each of the respective one or more features to the arbitrary application built from the features;

wherein the arbitrary application built from the features has a one-way view of the features consumed through the glue logic layer without permitting the features to be visible to the arbitrary application built;

defining, via a container, an interaction model of the arbitrary application and adopting, via the container, specified features, glue logic and a quarterback, wherein the quarterback is incorporated by and interfaces with the glue logic and provides defined requirements that establish governance of the container; and executing the arbitrary application built within the host organization.

23. The method of claim 22, wherein the interfaces available for the respective features each establish a series of events that the features are allowed to utilize.

24. The method of claim 23, further comprising:
executing a quarterback within the glue logic layer, the quarterback receiving the events utilized by the features, wherein the quarterback determines where the received events are routed.

25. Non-transitory computer readable storage media having instructions stored thereon that, when executed by a processor of a system, the instructions cause the system to perform operations comprising:

executing a foundation layer having logic to define a plurality of components;

executing a components layer providing the plurality of components, wherein each of the plurality of components defines one or more features to be consumed by an arbitrary application built from the features;

wherein the one or more features are to each incorporate one or more of the components defined by the foundation layer and further wherein each of the one or more features have visibility to one or more interfaces available for the respective features which permit each of the respective one or more features to connect with the one or more interfaces available to the respective features while preventing the respective one or more features from to be visible to any arbitrary application that consumes the arbitrary application;

executing a glue logic layer to link each of the respective one or more features to the arbitrary application built from the features;

wherein the arbitrary application built from the features has a one-way view of the features consumed through the glue logic layer without permitting the features to be visible to the arbitrary application built;

defining, via a container, an interaction model of the arbitrary application and adopting, via the container, specified features, glue logic and a quarterback, wherein the quarterback is incorporated by and interfaces with the glue logic and provides defined requirements that establish governance of the container;

and executing the arbitrary application built within the host organization.

* * * * *